United States Patent
Leslie-Hurd et al.

(10) Patent No.: US 11,467,981 B2
(45) Date of Patent: *Oct. 11, 2022

(54) MEMORY INITIALIZATION IN A PROTECTED REGION

(71) Applicant: Intel Corporation, Santa Clara, CA (US)

(72) Inventors: Rebekah M. Leslie-Hurd, Portland, OR (US); Francis X. McKeen, Portland, OR (US); Carlos V. Rozas, Portland, OR (US); Krystof C. Zmudzinski, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/807,872

(22) Filed: Mar. 3, 2020

(65) Prior Publication Data
US 2020/0310990 A1 Oct. 1, 2020

Related U.S. Application Data

(63) Continuation of application No. 16/036,654, filed on Jul. 16, 2018, now Pat. No. 10,592,436, which is a (Continued)

(51) Int. Cl.
*G06F 12/14* (2006.01)
*G06F 9/52* (2006.01)
(Continued)

(52) U.S. Cl.
CPC ............ *G06F 12/1441* (2013.01); *G06F 9/52* (2013.01); *G06F 21/53* (2013.01); *G06F 21/74* (2013.01); *G06F 21/79* (2013.01)

(58) Field of Classification Search
CPC . G06F 21/79; G06F 21/53; G06F 9/52; G06F 21/74; G06F 12/1441
(Continued)

(56) References Cited

U.S. PATENT DOCUMENTS

| 4,985,825 A | 1/1991 | Webb, Jr. et al. |
| 6,362,724 B1 | 3/2002 | Rosenau |

(Continued)

FOREIGN PATENT DOCUMENTS

JP 2014-112383 A 6/2014

OTHER PUBLICATIONS

McKeen et al., "Innovative Instructions and Software Model for Isolated Execution", HASP'13: Proceedings of the 2nd International Workshop on Hardware and Architectural Support for Security and Privacy, Article No. 10, Jun. 2013. (Year: 2013).*

(Continued)

*Primary Examiner* — Daniel D Tsui
*Assistant Examiner* — Zubair Ahmed
(74) *Attorney, Agent, or Firm* — Nicholson De Vos Webster & Elliott LLP

(57) ABSTRACT

Secure memory allocation technologies are described. A processor includes a processor core and a memory controller that is coupled between the processor core and main memory. The main memory comprises a protected region including secured pages. The processor, in response to a content copy instruction, is to initialize a target page in the protected region of an application address space. The processor, in response to the content copy instruction, is also to select content of a source page in the protected region to be copied. The processor, in response to the content copy instruction, is also to copy the selected content to the target page in the protected region of the application address space.

7 Claims, 15 Drawing Sheets

Related U.S. Application Data continuation of application No. 14/495,074, filed on Sep. 24, 2014, now abandoned.

(51) Int. Cl.
- *G06F 21/74* (2013.01)
- *G06F 21/79* (2013.01)
- *G06F 21/53* (2013.01)

(58) Field of Classification Search
USPC .................................................. 711/163, 154
See application file for complete search history.

(56) References Cited

U.S. PATENT DOCUMENTS

| | | | |
|---|---|---|---|
| 7,191,318 | B2 | 3/2007 | Tripathy et al. |
| 9,311,508 | B2 | 4/2016 | Leslie-Hurd et al. |
| 2002/0078307 | A1 | 6/2002 | Zahir |
| 2002/0147916 | A1 | 10/2002 | Strongin et al. |
| 2004/0205314 | A1 | 10/2004 | Babudri et al. |
| 2007/0022141 | A1 | 1/2007 | Singleton et al. |
| 2008/0052467 | A1 | 2/2008 | Thompson |
| 2012/0151141 | A1 | 6/2012 | Bell, Jr. et al. |
| 2012/0159184 | A1* | 6/2012 | Johnson ................ G06F 21/53 713/189 |
| 2012/0216049 | A1 | 8/2012 | Boivie et al. |
| 2013/0232345 | A1 | 9/2013 | Johnson et al. |
| 2013/0326165 | A1 | 12/2013 | Chang et al. |
| 2014/0006711 | A1 | 1/2014 | Xing |
| 2014/0189326 | A1 | 7/2014 | Leslie et al. |
| 2014/0281159 | A1 | 9/2014 | Saito et al. |

OTHER PUBLICATIONS

Sadeghi, "Trusted Execution Environments: Intel SGX", Summer 2014.

International Search Report and Written Opinion for International Application No. PCT/US2015/045385, dated Dec. 4, 2015.

Leslie-Hurd et al., "Processors, Methods, Systems, and Instructions to Change Addresses of Page of Secure Enclaves", U.S. Appl. No. 14/142,732, filed Dec. 27, 2013, 60 pages.

Supplemental European Search Report dated Mar. 28, 2018, on application No. EP 15 84 4284.

Advisory Action Office Action, U.S. Appl. No. 14/495,074, dated Dec. 1, 2017, 3 pages.

Advisory Action Office Action, U.S. Appl. No. 14/495,074, dated Jan. 11, 2017, 5 pages.

Advisory Action Office Action, U.S. Appl. No. 14/495,074, dated May 26, 2016, 5 pages.

Communication pursuant to Article 94(3) EPC, EP App. No. 15844284.8, dated Jun. 12, 2020, 7 pages.

Final Office Action, U.S. Appl. No. 14/495,074, dated Mar. 11, 2016, 20 pages.

Final Office Action, U.S. Appl. No. 14/495,074, dated Nov. 3, 2016, 21 pages.

Final Office Action, U.S. Appl. No. 14/495,074, dated Sep. 21, 2017, 24 pages.

International Preliminary Report on Patentability, PCT App. No. PCT/US2015/045385, dated Apr. 6, 2017, 12 pages.

Non-Final Office Action, U.S. Appl. No. 14/495,074, dated Dec. 14, 2015, 17 pages.

Non-Final Office Action, U.S. Appl. No. 14/495,074, dated Jul. 15, 2016, 21 pages.

Non-Final Office Action, U.S. Appl. No. 14/495,074, dated May 22, 2017, 25 pages.

Notice of Allowance, U.S. Appl. No. 14/495,074, dated Apr. 23, 2018, 13 pages.

Notice of Allowance, U.S. Appl. No. 16/036,654, dated Oct. 29, 2019, 9 pages.

Notification of Reason for Refusal, KR App. No. 10-2017-7005090, dated Oct. 22, 2020, 16 pages (8 pages of English Translation and 8 pages of Original Document).

Notice of Allowance, KR App. No. 10-2017-7005090, dated Mar. 17, 2021, 9 pages (4 pages of English Translation and 5 pages of Original Document).

European Search Report and Search Opinion, EP App. No. 21166256.4, dated May 31, 2021, 14 pages.

McKeen et al., "Innovative instructions and software model for isolated execution", Proceedings of the 2nd International Workshop on Hardware and Architectural Support for Security and Privacy, Jan. 2013, pp. 1-8.

Grant of Patent, KR App. No. 10-2021-7012114, dated Jul. 21, 2021, 4 pages (2 pages of English Translation and 2 pages of Original Document).

Summons to Attend Oral Proceedings Pursuant to Rule 115(1) EPC, EP App. No. 15844284.8, Jun. 4, 2021, 09 pages.

Intention to grant, EP App. No. 15844284.8, dated Jan. 11, 2022, 7 pages.

Decision to grant a European patent, EP App. No. 15844284.8, dated May 12, 2022, 2 pages.

* cited by examiner

MEMORY INITIALIZATION IN A PROTECTED REGION

RELATED APPLICATION

This application is a continuation of U.S. patent application Ser. No. 16/036,654, filed Jul. 16, 2018, which is a continuation of U.S. patent application Ser. No. 14/495,074, filed Sep. 24, 2014, the entire contents of both are hereby incorporated by reference.

The present disclosure pertains to computer systems; more specifically, to protection of data stored in the memory of a computer system.

BACKGROUND

Computer systems, such as hardware systems and software systems that run on computers often have undetected flaws that can be exploited by hardware attacks or software attacks, such as malicious computer programs that are received over the Internet or other communication networks. The hardware attacks and software attacks can include Trojans, viruses, worms, spyware, and other malware. Many existing computer security systems combat hardware attacks and software attacks by attempting to prevent the attacks from compromising any part of the computer system.

Processors in computer systems are designed to protect sensitive data in memory from both hardware attacks and software attacks. Some processors provide cryptographic mechanisms for encryption, integrity, and replay protection. Memory encryption protects the confidentiality of memory-resident data. Integrity protection prevents an attacker from causing any hidden modifications to the ciphertext (i.e., encrypted data, as opposed to plaintext which is unencrypted data) in memory. Replay protection eliminates any undetected temporal substitution of the ciphertext. In the absence of encryption, integrity, and replay protections, an attacker with physical access to the system can record snapshots of data lines and replay the data lines at a later point in time to modify the data lines and attack the computer system.

DESCRIPTION OF EMBODIMENTS

Secure memory allocation technologies are described. A processor includes a processor core and a memory controller coupled between the processor core and main memory. To prevent the hardware attacks or the software attacks from infiltrating selected applications, processors can provide protected regions for the selected applications to run. Traditional computer security systems provide relatively low assurance protection of the entire software system. Access to the protected regions from any software that does not reside in the protected regions is prevented. The protected regions provide relatively high security for the software in the protected regions.

In one example, the protected regions do not attempt to prevent the hardware attacks or the software attacks from compromising parts of the software system outside the protected regions, but stop the hardware attacks or the software attacks from compromising parts of the software system within the protected regions. Accordingly, if a software system process outside the protected regions becomes compromised, the compromised process may be prevented from compromising software system resources within the protected region. One advantage of the protected regions is to provide confidentiality and integrity for the selected programs to run even in the presence of privileged malware or other rogue software programs running at high privilege levels.

Figure 1:
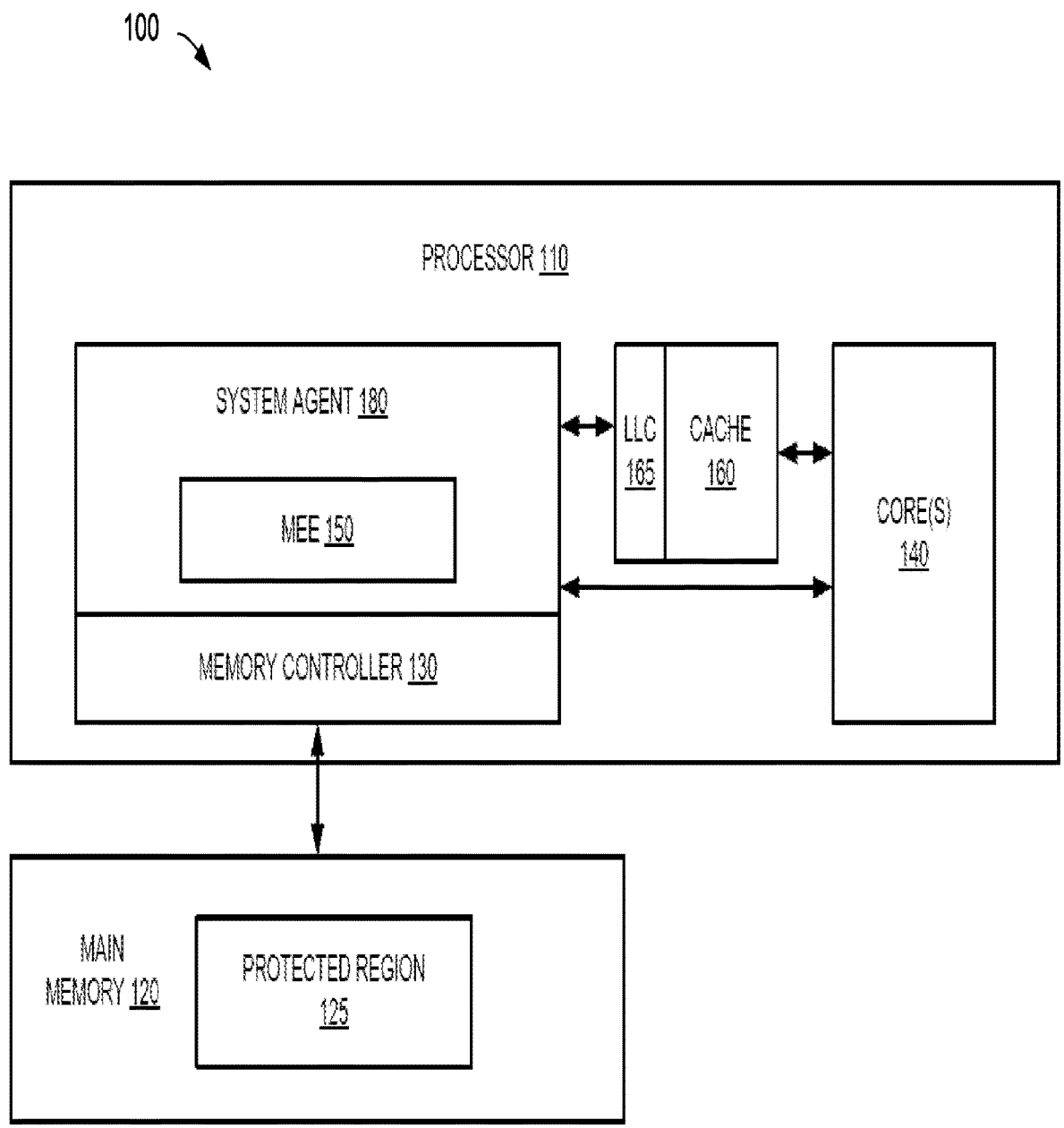
FIG. 1 is a block diagram illustrating a computing system that implements a memory encryption engine (MEE) for implementing secure memory according to one embodiment.

FIG. 1 is a block diagram illustrating a computing system 100 that implements a memory encryption engine (MEE) 150 for implementing secure memory according to one embodiment. The secure memory may be setup at boot time by a basic input-output system (BIOS). The processor 110 executes instructions to add secured pages to a protected region of memory as guided by software executing on the processor 110, such as an operating system (OS) or a virtual machine monitor (VMM), as described herein. Also, the memory protections afforded by the MEE are transparent in the sense that the processor does not have to execute any instructions for providing confidentiality, integrity and replay protections. For example, when any cache line belonging to a secure page is evicted, the MEE automatically provides these protections to that cache line. The processor 110 may be used in a system that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processor 110 may be used in a system on a chip (SoC) system.

The computing system 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, the computing system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

One embodiment may be described in the context of a single processor desktop or server system, but alternative embodiments may be included in a multiprocessor system. Computer system 100 may be an example of a 'hub' system architecture. The computer system 100 includes a processor 110 to process data signals. The processor 110, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 110 is coupled to a processor bus that transmits data signals between the processor 110 and other components in the system 100, such as memory 120 storing instruction, data, or any combination thereof. The other components of the system 100 may include a graphics accelerator, a memory controller hub, an I/O controller hub, a wireless transceiver, a Flash BIOS, a network controller, an audio controller, a serial expansion port, an I/O controller, etc. These elements perform their conventional functions that are well known to those familiar with the art.

In one embodiment, the processor 110 includes a Level 1 (L1) internal cache memory 160. Depending on the architecture, the processor 110 may have a single internal cache or multiple levels of internal caches. Other embodiments include a combination of both internal and external caches depending on the particular implementation and needs. A register file is to store different types of data in various registers including integer registers, floating point registers, vector registers, banked registers, shadow registers, checkpoint registers, status registers, configuration registers, and instruction pointer register.

It should be noted that the execution unit may or may not have a floating point unit. The processor 110, in one embodiment, includes a microcode (ucode) ROM to store microcode, which when executed, is to perform algorithms for certain macroinstructions or handle complex scenarios. Here, microcode is potentially updateable to handle logic bugs/fixes for processor 110.

Alternate embodiments of an execution unit may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by the processor 110. The processor 110 is coupled to the memory 120 via a processor bus. A system logic chip, such as a memory controller hub (MCH) may be coupled to the processor bus and memory 120. An MCH can provide a high bandwidth memory path to memory 120 for instruction and data storage and for storage of graphics commands, data and textures. The MCH can be used to direct data signals between the processor 110, memory 120, and other components in the system 100 and to bridge the data signals between processor bus, memory 120, and system I/O, for example. The MCH may be coupled to memory 120 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the memory 120, chipset, and processor 110. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another embodiment of a system, the instructions executed by the processor core 140 described above can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

The processor 110 includes one or more processor cores 140 to execute instructions of the system. The processor core 140 includes, but is not limited to, pre-fetch logic to fetch instructions, decode logic to decode the instructions, execution logic to execute instructions and the like. The processor 110 includes a cache 160 to cache instructions and/or data. The cache 160 includes, but is not limited to, level one, level two, and a last level cache (LLC) 165, or any other configuration of the cache memory within the processor 110. In another embodiment, the computing system 100 includes a component, such as a processor 110 to employ execution units including logic to perform algorithms for processing data, in accordance with the embodiment described herein.

The memory controller 130 performs functions that enable the processor 110 to access and communicate with a main memory 120 that includes a volatile memory and/or a non-volatile memory. In one embodiment, the memory controller 130 is coupled to a system agent 180 that includes an MEE 150. In one embodiment, the MEE 150 is located between the last level cache 165 and the memory controller 130 to perform encryption, decryption and authentication of the data lines moving in and out of a protected region 125 of the main memory 120. The MEE 150 is located on the processor die, while the memory 120 is located off the processor die.

According to one embodiment of the invention, the MEE 150 processes multiple memory read requests in parallel to improve the access latency to the protected region 125. The MEE 150 performs counter mode encryption which requires the encryption seed to be unique for a data line both temporally and spatially. Spatial uniqueness can be achieved by using the address of the data line to be accessed, while temporal uniqueness can be achieved by using a counter that serves as the version of the data line. In one embodiment, the MEE 150 also protects the data lines in the protected region 125 of the main memory 120 using a counter tree structure in which only the root of the tree is stored on-die and forms the root of trust (i.e., a trust boundary). The versions of the data lines are part of this counter tree structure. Alternatively, other protection mechanisms may be used for replay-protection. For example, Message Authentication Codes (MACs) associated with the secure cache lines can be stored on-die, since a successful replay attack would need to replay both the data line and its associated MAC. However, this solution has prohibitively high on-die storage requirements.

In one embodiment, memory encryption can protect a confidentiality of memory-resident data on the main memory 120. Memory encryption is primarily designed to protect against passive attacks where an attacker tries to silently observe the data lines as the data lines move on and off the processor. Some processors include an encryption module that encrypts sensitive data before the data is stored into a protected region of the memory. On a memory read to the protected region, the data line is decrypted before being fed into the processor. The encryption and decryption algorithms can be chosen based on the security level required by the user.

In another embodiment, the main memory 120 can divided into regions, including one or more protected regions 125 (also referred to herein as secure memory range or MEE region). Each region has multiple sections, an enclave page cache (EPC) section, a hardware reserved section of replay-protection and integrity metadata, and another hardware reserved section which is internal to implementation. In one embodiment, the protected region (MEE region) may be a fixed range or multiple protected regions (MEE regions) may be a set of multiple fixed ranges. In another embodiment, the entire memory could be configured as flexible memory, divided into multiple MEE regions. At startup, the entire memory starts as non-secure and the system software converts it as guided by the demand for secure memory on the system. As described herein, the main memory 120 may include multiple secure MEE regions, and may also include non-secure memory ranges.

Embodiments are not limited to computer systems. Alternative embodiments of the present invention can be used in other devices such as handheld devices and embedded applications. Some examples of handheld devices include cellular phones, Internet Protocol devices, digital cameras, PDAs, and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

Figure 2A:
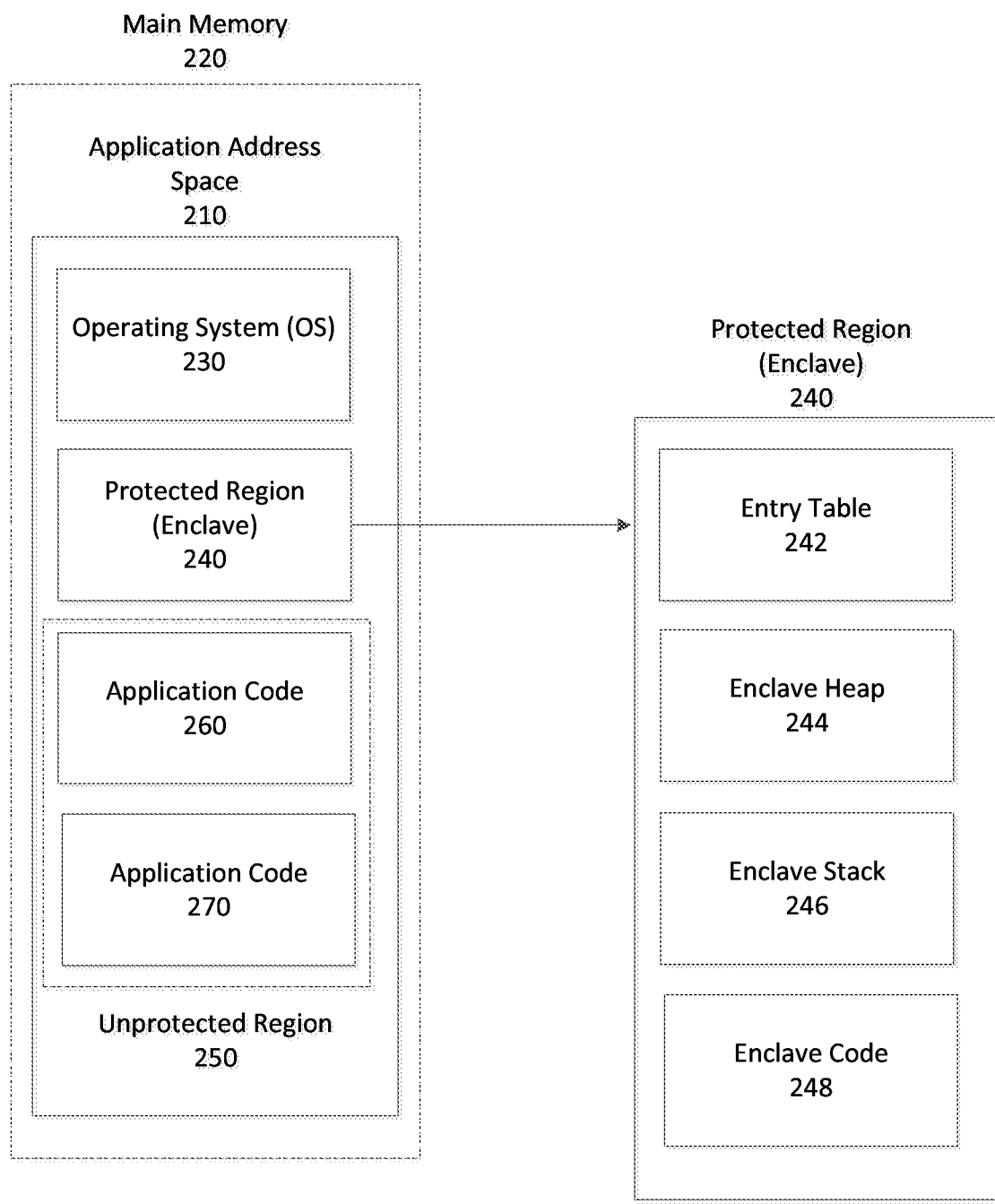
FIG. 2A illustrates a main memory that includes an application address space according to one embodiment.

FIG. 2A illustrates a main memory 220 (as shown in FIG. 1) that includes an application address space 210. FIG. 2 further illustrates that the application address space 210 can include memory allocated for operating system code 230, a protected region of memory 240 (also referred to herein as enclaves), and an unprotected region of memory 250. In one embodiment, the unprotected region of memory 250 can include application code 260 and 270. In another embodiment, the enclave 240 can include secure pages and the unprotected regions of memory 250 can include non-secure pages. In one example, the secure pages of the enclave 240 can include an entry table 242, an enclave heap 244, and enclave stack 246, and enclave code 248. The entry table 242 can be a table of references for a set of objects in the protected region 240. The enclave heap 244 can be a portion of memory where dynamically allocated memory can be located in the protected region 240. The enclave stack 246 can be a memory stack where local variables can be located in the protected region 240.

The enclave 240 is designed to protect third-party secrets from both hardware attacks and software attacks. An enclave can protect the confidentiality of enclave secrets by ensuring that the enclave secrets are stored encrypted when resident in platform memory. In order to provide complete protection from hardware attacks, an enclave provides integrity protection and replay protection. In the absence of integrity protection and replay protection, an attacker with physical access to the system can record snapshots of enclave cache lines and replay them at a later point in time. In order to achieve the enclave protections, an enclave can employ a memory encryption engine (MEE), which provides cryptographic mechanisms for encryption, integrity, and replay protection. The MEE is a hardware unit that implements the cryptographic functionality to secure pages when they are in memory. More specifically, the MEE can encrypt any cache line that gets evicted out of the processor if it belongs to a secure page and the MEE also provides integrity protection and replay-protection for the secure pages. Conventional strategies reserve a range of platform memory statically at boot time and enforce the cryptographic protections only on this range of memory. This secure memory range is referred to as the Enclave Page Cache (EPC). Enclave memory requests are satisfied from the EPC.

Traditionally, memory management facilities or memory controllers allocate memory pages at fixed linear addresses, e.g. a linear address of the memory page cannot be changed during a life of the data stored at the memory pages. The static allocation of secure memory can create problems if the secure memory requirements change overtime. As an example, a data center performing transaction processing in the day and switching to movie streaming in the night can have drastically different requirements for secure memory based on the enclave workloads running on the data center. In one implementation, 128 megabytes (MBs) of system memory is reserved as an EPC. However, in order to allow secure server applications to the enclave efficiently, a large EPC would be needed. With current static partitioning, this would require a multi-gigabyte partition of system memory to be reserved as EPC which cannot be reclaimed for non-secure uses. In addition, mobile devices with limited system memory may require dynamic re-partitioning of memory to allow the secure memory to be reclaimed for non-secure usages. Alternatively, other amounts of system memory can be reserved as the EPC.

The embodiments described herein that use a dynamic EPC architecture allow dynamic reallocation of EPC memory, making enclave implementations more efficient on servers requiring large amounts of EPC memory and on mobile platforms with limited memory systems. Software Guard Extensions (SGXs) of an interface architecture (IA) can enable dynamic management of the main memory in a protected execution area or protected region 240. SGX is a set of instructions and mechanisms for memory access for processors. In one embodiment, the SGX can enable an application to instantiate a protected region or enclave. In one example, memory pages can be reallocated to another linear address in the SGX architecture by freeing memory pages (including zeroing the contents of the memory pages) and then reallocating the freed memory pages to a new linear address. One advantage of SGX is to protect sensitive data from unauthorized access or modification by rogue software running at higher privilege levels. Another advantage of SGX is to enable applications to preserve the confidentiality and integrity of sensitive code and data without disrupting an ability of legitimate system software to schedule and manage the use of platform resources.

In one example, dynamic library loader algorithms can allocate memory pages at a private linear address during a memory page loading process and then relocate the memory pages to a target linear address. In one example, dynamic library loaders can run in the protected regions provided by SGX. One advantage of the dynamic library loaders running in the protected execution area is to increase performance gains in SGX applications and an efficient programming model. Another advantage of dynamic library loaders running within SGX enclaves is to enable a broader class of software to run within SGX and improve a performance of existing applications without heavy changes to the existing software models.

In one embodiment, the SGX can provide safeguards against viruses and malware by preventing access certain portions of memory. For example, sensitive or restricted data and/or code can be placed in the protected regions and the data and/or code is not visible outside of the enclave. One advantage of SGX is for virtual computing environments or virtual machines (VMs) where encryption is used within a guest operating system. In this example, database pages can be stored in SGX protected regions and/or operating system caches can be stored in SGX enclaves protected regions to protect the data and/or code from being accessed or copied.

Figure 2B:
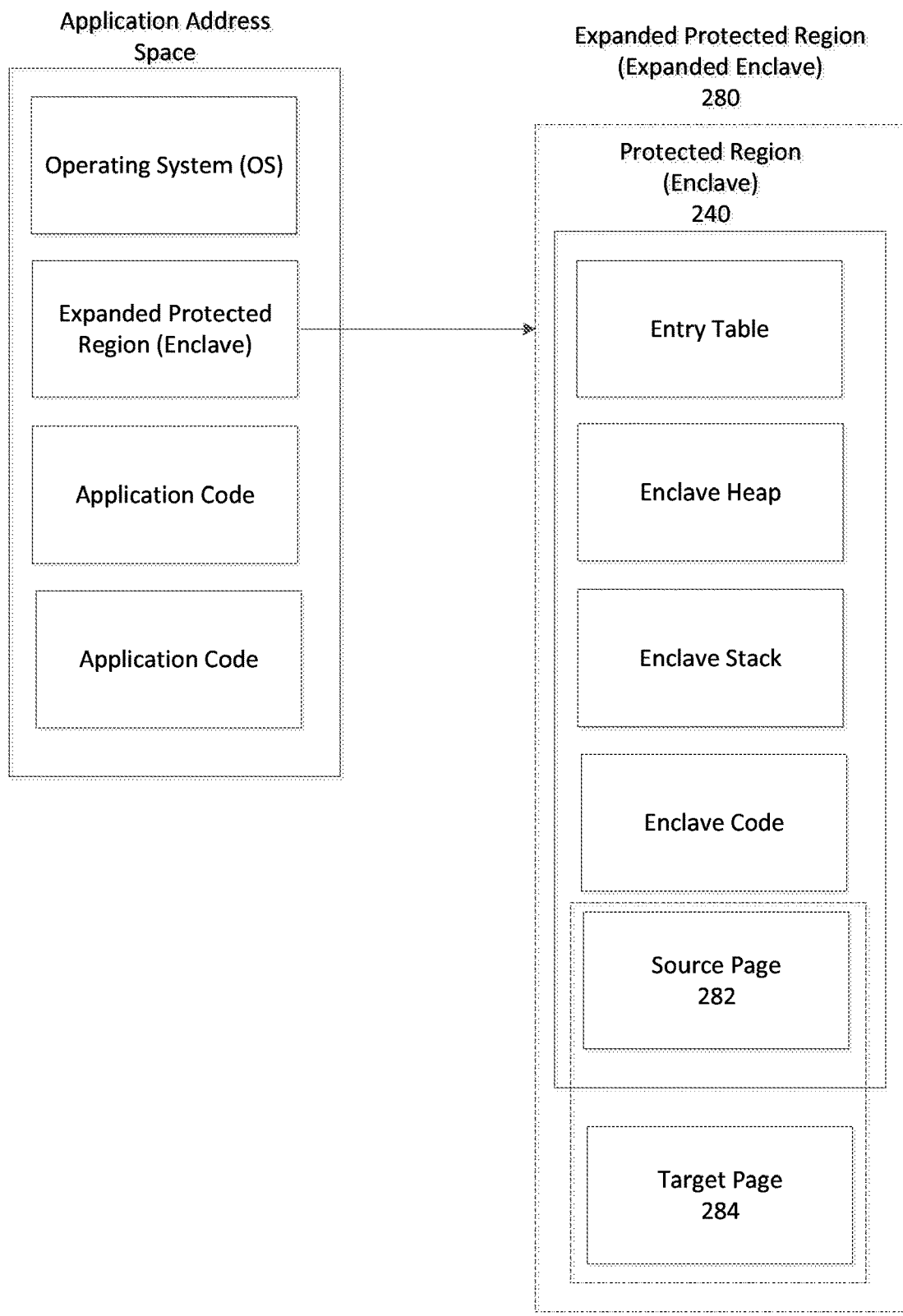
FIG. 2B illustrates that a protected region can include one or more source pages with selected content or code according to one embodiment.

FIG. 2B illustrates that a protected region 240 can include one or more source pages 282 with selected content or code. FIG. 2B further illustrates that the enclave 240 can have one or more target pages 284 added to the protected region to increase the memory size of the enclave 240, e.g. an expanded enclave 280. In one embodiment, selected content of the one or more source pages 282 can be copied to the one or more target pages 284. The remaining parts of FIG. 2B are the same as FIG. 2A.

Figure 2C:
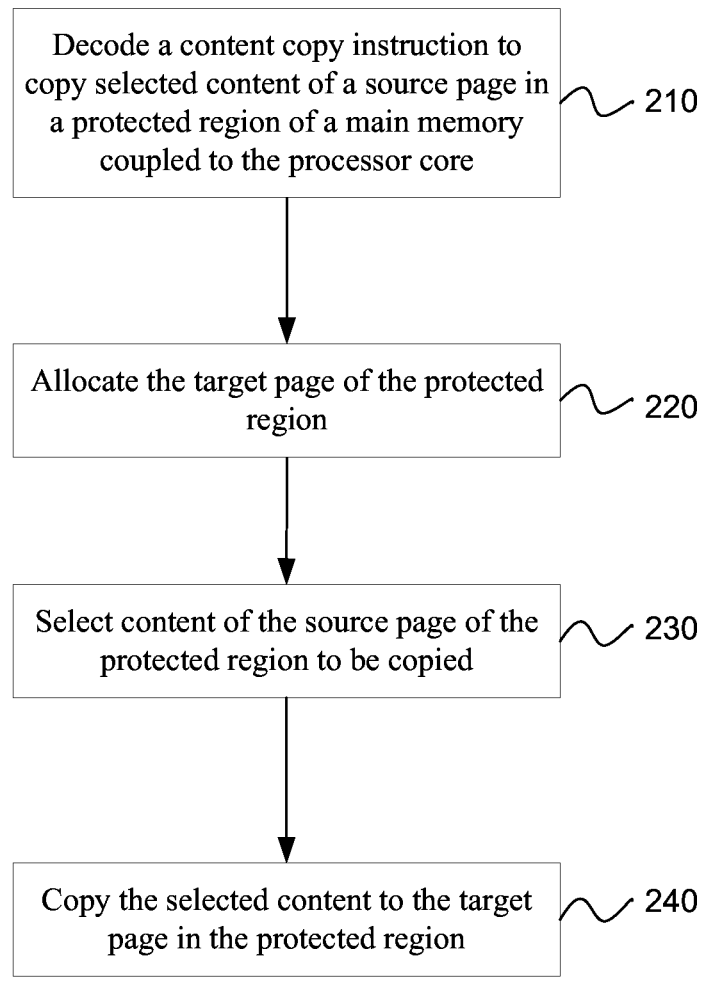
FIG. 2C is a flow diagram illustrating a method of copy the selected content of the source page to a target page within the protected region according to one embodiment.

FIG. 2C is a flow diagram illustrating a method 200 of copy the selected content of the source page to a target page within the protected region according to one embodiment. Method 200 may be performed by processing logic that may comprise hardware (e.g., circuitry, dedicated logic, programmable logic, microcode, etc.) software (such as instructions running on the processor), firmware or a combination thereof. In one embodiment, the processor 110 of FIG. 1 performs the method 200. Alternatively, other components of the computing system 100 of FIG. 1 may perform some or all of the operations of the method 200. In another embodiment, the processor 600 of FIG. 6A or 6B performs the method 200. In another embodiment, the processor 700 of FIG. 7 performs the method 200. In another embodiment, the processors 870 and/or 880 of FIG. 8 perform the method 200. In another embodiment, the processors 970 and/or 980 of FIG. 9 perform the method 200. In another embodiment, the one or more of the cores 1002 of FIG. 10 performs the method 200. In another embodiment, the cores 1106 and/or 1107 of FIG. 11 performs the method 200. In another embodiment, the processing device 1202 of FIG. 12 performs the method 200. Alternatively, other components of the computing systems of FIG. 1 and/or FIGS. 6-12 may perform some or all of the operations of the method 200.

Referring to FIG. 2C, the method 200 begins by the processing logic decoding a content copy instruction to copy selected content of a source page in a protected region of a main memory coupled to the processor logic (block 210). The processing logic executes the content copy instruction to copy the selected content of the source page to a target page within the protected region. The processing logic, in response to the content copy instruction, allocates the target page of the protected region (block 220). The processing logic, in response to the content copy instruction, selects content of the source page of the protected region to be copied (block 230). The processing logic, in response to the content copy instruction, copies the selected content to the target page in the protected region.

Figure 2D:
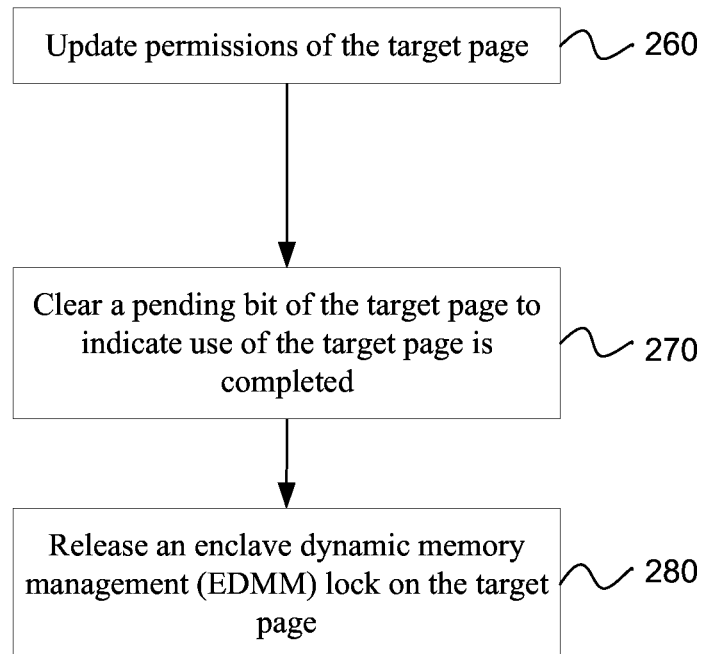
FIG. 2D is a flow diagram illustrating a method of copy the selected content of the source page to a target page within the protected region according to one embodiment.

FIG. 2D is a flow diagram illustrating a method 250 of copy the selected content of the source page to a target page within the protected region according to one embodiment. Method 250 may be performed by processing logic that may comprise hardware (e.g., circuitry, dedicated logic, programmable logic, microcode, etc.) software (such as instructions running on the processor), firmware or a combination thereof. In one embodiment, the processor 110 of FIG. 1 performs the method 250. Alternatively, other components of the computing system 100 of FIG. 1 may perform some or all of the operations of the method 250. In another embodiment, the processor 600 of FIG. 6A or 6B performs the method 250. In another embodiment, the processor 700 of FIG. 7 performs the method 250. In another embodiment, the processors 870 and/or 880 of FIG. 8 perform the method 250. In another embodiment, the processors 970 and/or 980 of FIG. 9 perform the method 250. In another embodiment, the one or more of the cores 1002 of FIG. 10 performs the method 250. In another embodiment, the cores 1106 and/or 1107 of FIG. 11 performs the method 250. In another embodiment, the processing device 1202 of FIG. 12 performs the method 250. Alternatively, other components of the computing systems of FIG. 1 and/or FIGS. 6-12 may perform some or all of the operations of the method 250.

Referring to FIG. 2D, the method 250 begins by the processing logic updating permissions of the target page (block 260). The processing logic, in response to the content copy instruction, clears a pending bit of the target page to indicate use of the target page is completed (block 270). The processing logic, in response to the content copy instruction, releases an enclave dynamic memory management (EDMM) lock on the target page (block 280).

In one embodiment, the processing logic modifies permissions of the target page. In another embodiment, the processing logic validates selected source parameters of the source page. In another embodiment, the processing logic validates selected target parameters of the target page. In another embodiment, the processing logic validating the selected source parameters of the source page further comprises: determining a readable status of the source page and determining an enclave linear address range (ELRange) of the source page. In another embodiment, the processing logic validating the selected target parameters of the target page further comprises: determining a writable status of the target page; determining an ELRange of the target page; and determining a location of the target page within the protected region. In another embodiment, the processing logic validating the selected target parameters of the target page further comprises: acquiring an EDMM lock; verifying that a status of the target page is regular and pending; and verifying that the target page is accessed through a correct linear address.

The processing logic (as in FIGS. 2C and 2D), can perform a memory allocation process to add secured pages to the protected region 125 in the main memory 120. The processing logic, can use a page add instruction (such as an EAUG instruction) to add a target page to the protected region. In one embodiment, the added target page has a pending status when the page add instruction is executed.

The processing logic in response to the page add instruction, can determine when an page acceptance instruction is received and change a status of the target page from pending when the page acceptance instruction is received. The processing logic in response to the page acceptance instruction, can add the target page to the protected region. The processing logic can determine a privilege level of the target page and perform the page add instruction when a privilege level of the target page is zero.

The processing logic can use a content copy instruction to copy content of a source page in the protected region to a target page in the same protected region. In one example, the processing logic can in response to the content copy instruction initialize a target page in an application address space of the protected region. In another example, the processing logic can in response to the content copy instruction, select content of a source page in the protected region to be copied. In another example, the processing logic can in response to the content copy instruction, copy the selected content to the target page in the application address space of the protected region. In one embodiment, the processing logic can in response to the content copy instruction, copy the selected content to the target page while an application is inactive or not running, where the application is stored in the protected region 125 of the main memory 120. In one embodiment, the processing logic can in response to the content copy instruction, copy the selected content to the target page while an application is running, where the application is stored in the protected region 125 of the main memory 120. One advantage of the processing logic copying the selected content to the target page while an application may be that running may be enabled to enable additional security protections without disrupting existing applications or operating systems.

In one embodiment, the page add instruction can include memory parameter information, wherein the memory parameter information includes: an effective address of a page information (PAGEINFO) structure and an effective address of an EPC page. In another embodiment, the PAGEINFO structure includes a security information (SECINFO) structure of the target page and a page information structure of the source page (SRCPAGE).

In one embodiment, the processing logic can in response to the page add instruction: associate a free EPC page with one or more selected SECS pages in the section of the protected region; store a protected region offset attribute and a protected region security attribute in an enclave page cache map (EPCM); and zero contents of the target page. In another embodiment, the processor core can determine when a page acceptance instruction is received. In one example, a status of the target page remains pending until the processor core receives the page acceptance instruction. In this example, the processing logic adds the target page to the protected region when the page acceptance instruction is received.

In one embodiment, the content copy instruction can include memory parameter information, including: a SECINFO structure, where the SECINFO structure specifies a selected permissions level for the target page being modified and a requested type for the target page when the selected content is copied; an effective address of the target page that the content is copied to; and an effective address of the source page that the content is copied from. In another embodiment, the source page can be a valid EPC page and can be a PT_REG type that is not in a blocked state, a pending state, or a modified state. In another embodiment, the target page can be a valid EPC page and can be a PT_REG type that is in a pending state but not a modified state or a blocked state.

Software executing on the processor core can securely relocate securely initialized memory pages using a memory allocation process. The processing logic in response to a page add instruction (EAUG instruction), can add a read/write accessible memory page to an existing enclave. An example of the EAUG instruction is seen below:

| Opcode | Instruction | Description |
|---|---|---|
| EAX = 0Dh | ENCLS [EAUG] | Adds a page to any enclave RBX (in) holds the address of a PAGEINFO. RCX (in) holds the effective address of an EPC page. |

In one embodiment, the existing enclave can be running when the read/write accessible memory page is added. In one example, the processor core, in response the EAUG instruction, can associate a free EPC memory page with a given SECS page residing in the EPC. In this example, the processor core, in response to an EAUG instruction, can store an enclave offset and security attributes in an EPCM and zero the contents of the EPC memory page. In one embodiment, the processor core can determine a privilege level of the EPC memory page and perform the EAUG instruction when a privilege level of the target page is zero. In another embodiment, the processor core may not perform the EAUG instruction when the privilege level of the target page is not zero. In another embodiment, the processor core can perform the EAUG instruction without determining the privilege level of the EPC memory page.

In one example, the EAUG instruction can include EAUG memory parameter information. An example of the EAUG memory parameter information is seen below:

| Memory Parameter | Permissions | Semantics |
|---|---|---|
| [RBX]PAGEINFO | R | Non Enclave Access |
| [RBX]PAGEINFO.SECS | RW | Enclave Access |
| [RBX]PAGEINFO.SECINFO | R | Non Enclave Access |
| [RCX]EPCPAGE | RW | Enclave Access |

The BX register (RBX) contains an effective address of a page information (PAGEINFO) structure. The CX register (RCX) contains an effective address of an EPC page. In one embodiment, the SRCPAGE field and SECINFO field of the PAGEINFO structure can be zero. In another example, the EAUG instruction can include other EAUG memory parameter information not explicitly included in the preceding table. In another example, the EAUG instruction may not include memory parameter information.

In one embodiment, the processor core, in response to the EAUG instruction, may fail to add the target EPC page to an enclave when one or more selected conditions occurs, including when: an operand is not properly aligned; unsupported security attributes are set; selected SGX enclave control structure (SECS) pages are locked by another thread; the page add instruction does not contain an effective address of a target EPC page or a source EPC page; the target EPC page or the source EPC page is locked by another thread the target EPC page or the source EPC page is currently in a valid state; or a selected protected region offset is outside of an effective address range of the protected region.

In one example, the EAUG instruction can include EAUG temporary variables. An example of the EAUG temporary variables is seen below:

| Variable Name | Type | Size | Description |
|---|---|---|---|
| TMP_SECS | Effective Address | 32/64 | Effective address of the SECS of the enclave to which a page is being added |
| SCRATCH_SECINFO | Effective Address | 32/64 | Effective address of a SECINFO which contains security attributes of the page to be added |
| TMP_LINADDR | Unsigned Integer | 64 | Holds the effective address to be stored in the EPCM |

Alternatively, the EAUG instruction can include other variables of different types or sizes. In another example, the EAUG instruction can include other EAUG temporary variables not explicitly listed in the preceding table. In another example, the EAUG instruction may not include temporary variables.

The following description provides exemplary pseudo code of the EAUG instruction, as described herein, according to one embodiment.

```
// check alignment of PAGEINFO (RBX)
if (DS:RBX is not 32B aligned) #GP(0);
// make sure PAGEINFO (DS:RBX) is read accessible
<< DS:RBX should be read accessible >>
// check alignment of the EPCPAGE (RCX)
if (DS:RCX is not 4KB aligned) #GP(0);
// make sure EPCPAGE (DS:RCX) is write accessible
<< DS:RCX should be read/write accessible >>
// check that EPCPAGE address (DS:RCX) is the address of an EPC page
if (DS:RCX does not resolve within an EPC) #PF(DS:RCX);
// copy data from PAGEINFO into temp variables
TMP_SECS = DS:RBX.SECS;
SCRATCH_SECINFO = DS:RBX.SECINFO;
TMP_LINADDR = DS:RBX.LINADDR;
// check alignment of PAGEINFO fields
if ((DS:TMP_SECS is not 4KB aligned) OR
    (DS:SCRATCH_SECINFO is not 64B aligned) OR
    (TMP_LINADDR is not 4KB aligned))
        #GP(0);
// check that unused PAGEINFO fields are zero
if ((DS:RBX.SRCPAGE is not 0))
        #GP(0)
// make sure DS:TMP_SECS is read/write accessible
<< DS:TMP_SECS should be read/write accessible >>
// Make sure DS:SCRATCH_SECINFO is read accessible
<< DS:SCRATCH_SECINFO should be read accessible >>
// check that DS:TMP_SECS is the address of an EPC page
if (DS:TMP_SECS does not resolve within an EPC)
#PF(DS:TMP_SECS);
// check that SECINFO flags for misconfiguration
// reserved flags must be zero
// SECINFO.FLAGS.PT must either be PT_REG OR PT_TCS
if (SCRATCH_SECINFO reserved fields are not 0 OR
(NOT (SCRATCH_SECINFO.FLAGS.PT is PT_REG OR
SCRATCH_SECINFO.FLAGS.PT is PT_TCS)) OR
(SCRATCH_SECINFO.FLAGS.R is 0) OR
(SCRATCH_SECINFO.FLAGS.X is 1))
        #GP(0);
// try to acquire EPCM entry write lock for EPC page
if (NOT EPCM(DS:RCX).EntryLock.Acquire(WRITE))
{
#GP(0);
}
// verify that DS:RCX is an available EPC page
if (EPCM(DS:RCX).VALID != 0)
{
        EPCM(DS:RCX).EntryLock.Release( );
        #PF(DS:RCX);
}
// try to acquire an EPCM entry read lock for TMP_SECS
if (NOT EPCM(DS:TMP_SECS).EntryLock.Acquire(READ))
{
        EPCM(DS:RCX).EntryLock.Release( );
        #GP(0);
}
// check that DS:TMP_SECS is a valid SECS
if ((EPCM(DS:TMP_SECS).VALID = 0) OR
(EPCM(DS:TMP_SECS).PT is not PT_SECS))
{
        EPCM(DS:TMP_SECS).EntryLock.Release( );
        EPCM(DS:RCX).EntryLock.Release( );
        #PF(DS:TMP_SECS);
}
// check that DS:TMP_SECS is initialized
if(DS:TMP_SECS.ATTRIBUTES.INIT = 0)
{
        EPCM(DS:TMP_SECS).EntryLock.Release( );
        EPCM(DS:RCX).EntryLock.Release( );
        #GP(0);
}
// check that the enclave offset falls within the enclave linear address
// range defined by the baenclave and size stored in the SECS page
if (TMP_LINADDR < DS:TMP_SECS.BASEADDR OR
    TMP_LINADDR >= DS:TMP_SECS.BASEADDR +
DS:TMP_SECS.SIZE)
{
        EPCM(DS:TMP_SECS).EntryLock.Release( );
        EPCM(DS:RCX).EntryLock.Release( );
        #GP(0);
}
// clear contents of EPC page
<< zero DS:RCX[4095:0] >>
// update EPCM
EPCM(DS:RCX).R = 1;
EPCM(DS:RCX).W = SCRATCH_SECINFO.FLAGS.W;
EPCM(DS:RCX).X = 0;
EPCM(DS:RCX).PT = SCRATCH_SECINFO.FLAGS.PT;
EPCM(DS:RCX).enclaveADDRESS = TMP_LINADDR;
EPCM(DS:RCX).BLOCKED = 0;
EPCM(DS:RCX).PENDING = 1;
EPCM(DS:RCX).MODIFIED = 0;
EPCM(DS:RCX).BEPOCH = 0;
// associate EPCPAGE with specified SECS by storing DS:TMP_SECS identifier
<< update EPCM(DS:RCX).enclaveSECS to reference DS:TMP_SECS identifier>>
// Increment child counter in SECS
LockedXAdd(DS:TMP_SECS.CHLDCNT, 1);
// mark EPCPAGE as valid
EPCM(DS:RCX).VALID = 1;
// releaenclave all acquired locks
EPCM(DS:TMP_SECS).EntryLock.Release( );
EPCM(DS:RCX).EntryLock.Release( );
end_of_flow
```

Flags Affected:

None

Protected Mode Exceptions:

| | |
|---|---|
| #GP(0) | If a memory operand effective address is outside the DS segment limit. |
| | If DS segment is unusable |
| | If a memory operand is not properly aligned. |
| | If an enclave memory operand is the wrong type. |
| | If a memory operand is locked. |
| #PF(fault-code) | If a page fault occurs in accessing memory operands, including EPCM-induced faults. |

64-Bit Mode Exceptions:

| | |
|---|---|
| #GP(0) | If a memory address is non-canonical form. |
| | If a memory operand is not properly aligned. |
| | If an enclave memory operand is the wrong type. |
| | If a memory operand is locked. |
| #PF(fault-code) | If a page fault occurs in accessing memory operands, including EPCM-induced faults. |

In one embodiment, the EAUG instruction can include other operations or other code not included in the preceding exemplary pseudo code. In another embodiment, the EAUG instruction can include a portion of the exemplary pseudo code or the other operations. In another embodiment, the EAUG instruction can include code or operations not explicitly listed in the preceding exemplary pseudo code.

Figure 3:
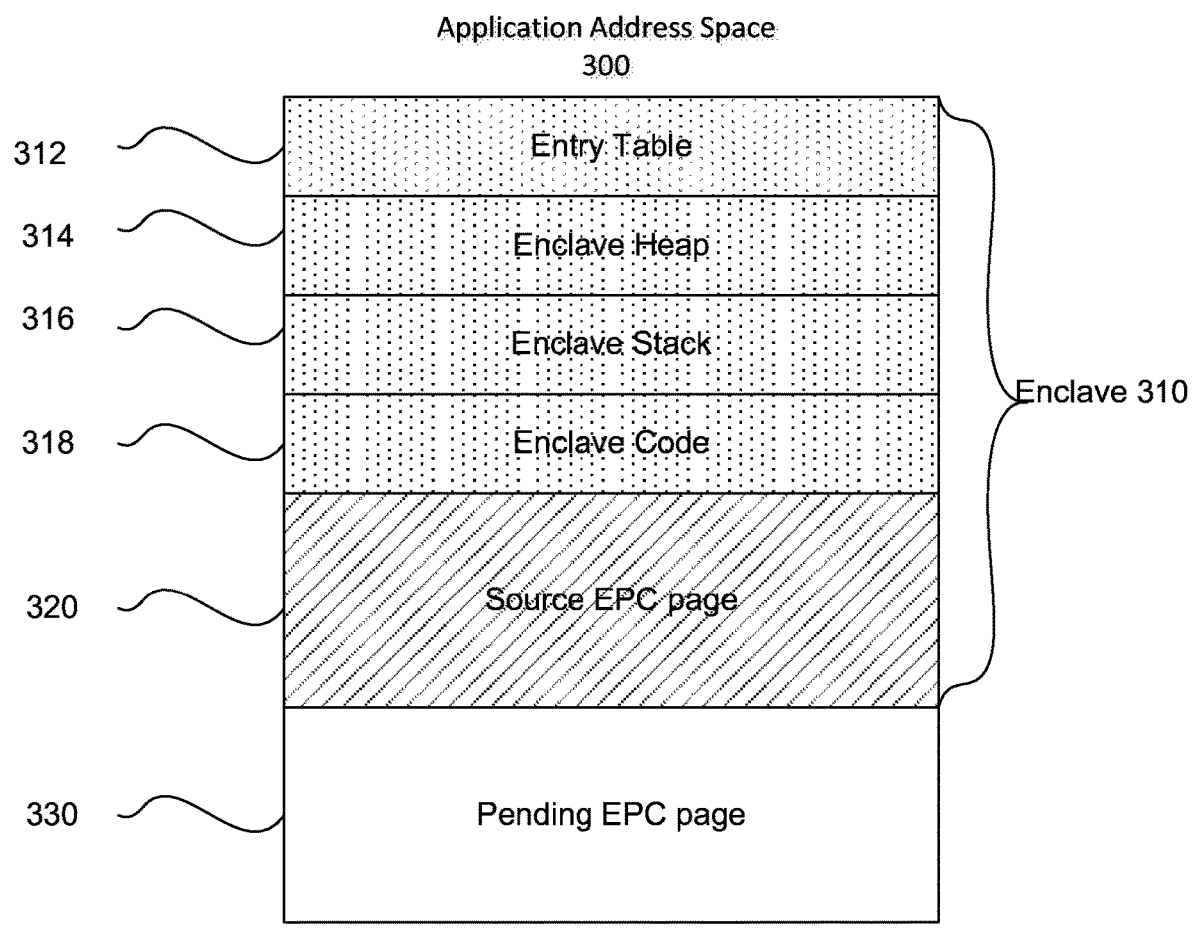
FIG. 3 illustrates an enclave within an application address space according to one embodiment.

FIG. 3 illustrates an enclave 310 within an application address space 300. FIG. 3 further illustrates that the application address space 300 includes an enclave 310 with an entry table 312, an enclave heap 314, and enclave stack 316, and enclave code 318, and a source EPC page 320. The entry table 312 can be a table of references for a set of objects in the enclave 310. The enclave heap 314 can be a portion of memory where dynamically allocated memory can be located in the enclave 310. The enclave stack 316 can be a memory stack where local variables can be located in the enclave 310. The application address space 300 also includes a pending EPC page 330 that is outside the enclave 310. In one embodiment, a status of an EPC memory page, such as pending EPC page 330, is placed in a pending status until the processor core executes a page acceptance instruction (EACCEPT instruction).

Figure 4:
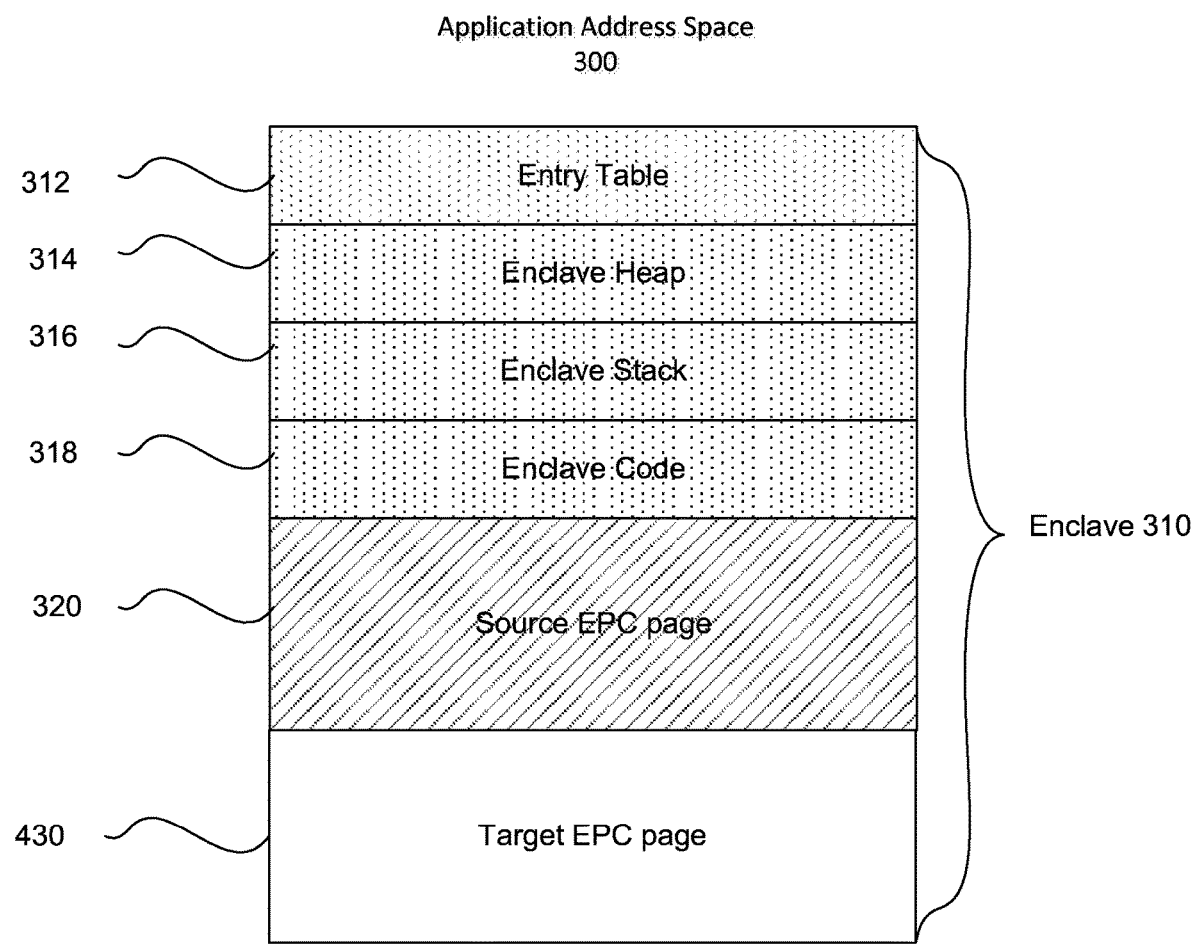
FIG. 4 illustrates an enclave with the pending EPC page converted to a normal EPC page according to one embodiment.

FIG. 4A illustrates an enclave with the pending EPC page converted to a normal EPC page according to one embodiment. In one embodiment, when the processor core executes the EACCEPT instruction, a pending EPC page (as shown in FIG. 3) becomes accessible as a normal EPC page (e.g. target EPC page 430) in the enclave 310. The remainder of FIG. 4A is the same as in FIG. 3.

In one embodiment, the processor core, in response to a content copy instruction EACCEPTCOPY instruction), can add a read/write accessible memory page to an existing enclave. An example of the EACCEPTCOPY instruction is seen below:

| Opcode | Instruction | Description |
|---|---|---|
| EAX = xx | ENCLU[EACCEPTCOPY] | Copy new contents into a page created using an EAUG instruction.<br>RBX (in) holds the address of an SECINFO.<br>RCX (in) holds the address of the target EPC page.<br>RDX (in) holds the address of the source EPC page |

In another example, the EACCEPTCOPY instruction can include other operational codes (Opcodes) or descriptions not explicitly included in the preceding table.

The processor core, in response to the EACCEPTCOPY instruction, can copy the contents from an existing EPC page (e.g. a source EPC page) into a newly allocated EPC page (e.g. a target EPC page) that was created using the EAUG instruction, as discussed in the preceding paragraphs. In one embodiment, the processor core, in response to the EACCEPTCOPY instruction, can modify the permissions of the target page. In one example, the processor core, in response to the EACCEPTCOPY instruction, can initialize a pending EPC page (e.g. a target EPC page) by copying contents of an existing protected page (e.g. a source EPC page) within the same enclave and update a access permission level of the target page to a selected access permissions level. In another example, the processor core, in response to the EACCEPTCOPY instruction, can clear a pending bit of the target page to indicate a use of the target page is completed and release an EDMM lock on the target page.

Figure 5:
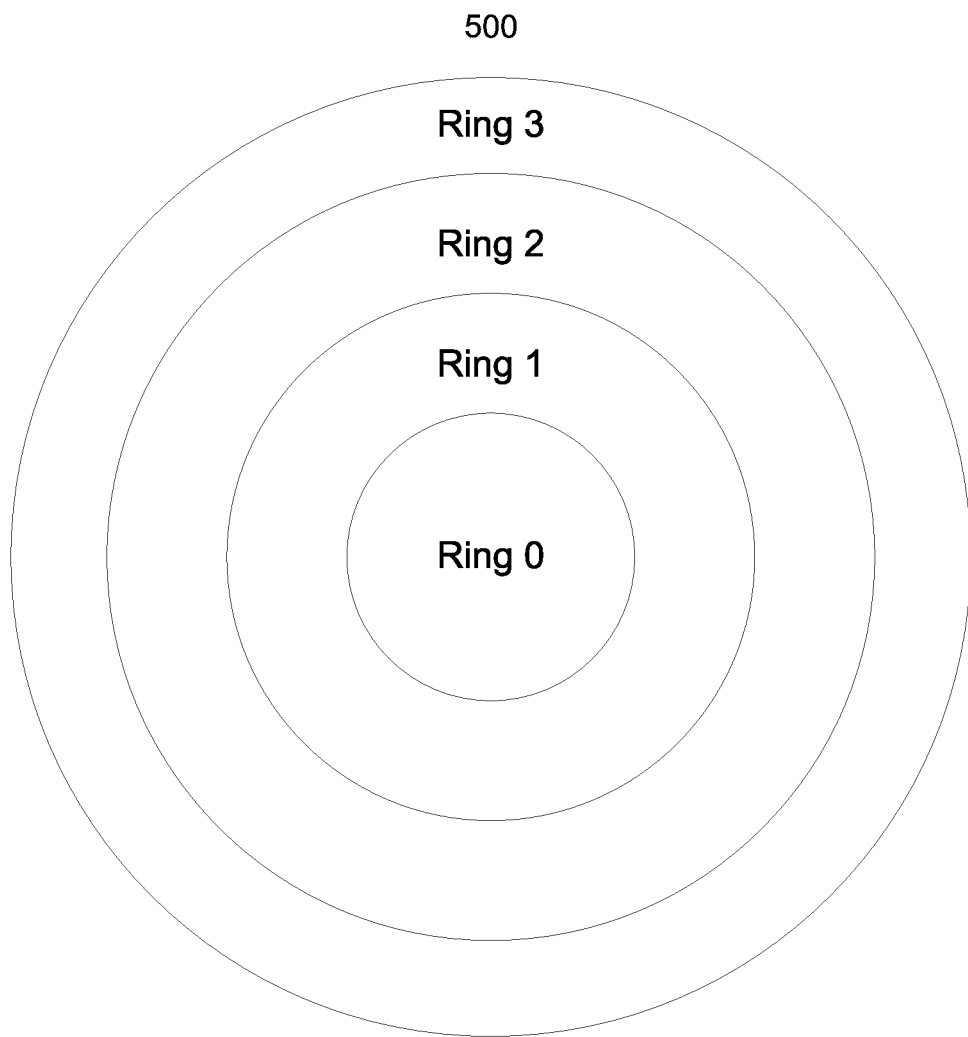
FIG. 5 depicts different privilege level rings according to one embodiment.

In one embodiment, when the content is copied to the target EPC page and the access permissions level is updated, the source EPC page can remain valid. One advantage of the processing core executing the EACCEPTCOPY instruction to copy content from a source EPC page to a target EPC page is to simplify a software model for dynamic library loaders by requiring fewer privilege ring transitions to performance. FIG. 5 depicts a privilege ring 500 with different privilege level rings. In one embodiment, privilege level ring 0 is the most-trusted or highest privilege level ring and the trust level or privilege level successively decrease from privilege level ring 0 to privilege level ring 3, e.g. privilege level ring 3 has the lowest trust level or privilege level.

In another embodiment, the processor core can determine a validity of the source EPC page and a PT_REG type of the source EPC page. In one example, when the processor core determines that the source EPC page is a valid EPC page with a PT_REG type that is not in a BLOCKED, PENDING or MODIFIED state, the processor core can copy the contents from the source EPC page to the target EPC page.

In one embodiment, the processor core, in response to the EACCEPTCOPY instruction, may fail to copy the contents from the source EPC page to the target EPC page when one or more selected conditions occurs, including when: an operand is not properly aligned; an unsupported access right combination is requested; the operand does not refer to the target EPC page or the source EPC page; the target EPC page or the source EPC page is in use by another thread; the target EPC page or the source EPC page does not have a selected PT_REG type; or the target EPC page or the source EPC page is not a valid page.

In one example, the EACCEPTCOPY instruction can include EACCEPTCOPY memory parameter information. An example of the EACCEPTCOPY memory parameter information is seen below:

| Memory Parameter | Permissions | Semantics |
|---|---|---|
| [RBX]SECINFO | R | Enclave Access |
| [RCX]EPCPAGE | RW | Enclave Access |
| [RDX]EPCPAGE | R | Enclave Access |

In one embodiment, the RBX can contain an effective address of a SECINFO structure. In one example, the SECINFO can specify desired permissions for an EPC page being modified as well as a requested type for the EPC page (such as PT_REG or PT_TCS) when a copy of the contents of the EPC page has been completed. In another example, pending fields and modified fields of the SECINFO structure can be ignored. In another embodiment, the RCX can contain an effective address of the target EPC page. In another embodiment, the RDX can contain an effective address of the source EPC page from which data can be copied. In another example, the EACCEPTCOPY instruction can include other EACCEPTCOPY memory parameter information not explicitly included in the preceding table. In another example, the EACCEPTCOPY instruction may not include memory parameter information.

In one example, the EACCEPTCOPY instruction can include EACCEPTCOPY temporary variables. An example of the EACCEPTCOPY temporary variables is seen below:

| Variable Name | Type | Size | Description |
| --- | --- | --- | --- |
| SCRATCH_SECINFO | SECINFO | 64 bytes | Scratch storage for holding the contents of DS:RBX |

In another example, the EACCEPTCOPY instruction can include other EACCEPTCOPY temporary variables not explicitly listed in the preceding table. In another example, the EACCEPTCOPY instruction may not include temporary variables.

The following description provides exemplary pseudo code of the EACCEPTCOPY instruction, as described herein according to one embodiment.

```
// check alignment of SECINFO (RBX)
if (DS:RBX is not 64B aligned) #GP(0);
// check that page falls in ELRANGE
if (<< DS:RBX does not resolve to a linear address in
ELRANGE >>) #GP(0);
// make sure SECINFO (DS:RBX) is read accessible
<< DS:RBX should be read accessible >>
// check to make sure DS:RBX is an EPC address
if (<< DS:RBX does not resolve within an EPC >>) #PF(DS:RBX);
// and that SECINFO points to a valid, accessible page of the running
enclave
if ((EPCM(DS:RBX).VALID is 0) OR
    (EPCM(DS:RBX).PENDING is not 0) OR
    (EPCM(DS:RBX).MODIFIED is not 0) OR
    (EPCM(DS:RBX).BLOCKED is not 0) OR
    (EPCM(DS:RBX).R is 0) OR
    (EPCM(DS:RBX).PT is not PT_REG) OR
    (EPCM(DS:RBX).enclaveSECS != CR_ACTIVE_SECS) OR
    (EPCM(DS:RBX).enclaveADDRESS != DS:RBX))
{
    #PF(DS:RBX);
}
// copy SECINFO contents into a scratch SECINFO
// page may become modified or blocked between above checks and copy
<< copy 64B from DS:RBX to SCRATCH_SECINFO >>
if (SCRATCH_SECINFO reserved fields are not 0) #GP(0);
// check alignment of target EPCPAGE (RCX)
if (DS:RCX is not 4KB aligned) #GP(0);
// check that target EPCPAGE falls in ELRANGE
if (<< DS:RCX does not resolve to a linear address in
ELRANGE >>) #GP(0);
// make sure target EPCPAGE (DS:RCX) is read/write accessible
<< DS:RCX should be read/write accessible >>
// check that target EPCPAGE address (DS:RCX) is the address of an
EPC page
if (<<DS:RCX does not resolve within EPC>>) #PF(DS:RCX);
// check alignment of source EPCPAGE (RDX)
if (DS:RDX is not 4KB aligned) #GP(0);
// check that source EPCPAGE falls in ELRANGE
if (<< DS:RDX does not resolve to a linear address in
ELRANGE >>) #GP(0);
// make sure source EPCPAGE (DS:RDX) is read accessible
<< DS:RDX should be read accessible >>
// check that source EPCPAGE address (DS:RDX) is the address of
an EPC page
if (<<DS:RDX does not resolve within EPC>>) #PF(DS:RDX);
// check SECINFO flags for misconfiguration
// write access without read access not supported
if ((SCRATCH_SECINFO.FLAGS.R is 0) AND
(SCRATCH_SECINFO.FLAGS.W is not 0))
{
    #GP(0);
}
// requested page type must be PT_REG or PT_TCS
if (NOT ((SCRATCH_SECINFO.FLAGS.PT is PT_REG) OR
    (SCRATCH_SECINFO.FLAGS.PT is PT_TCS))
{
    #GP(0);
}
// verify that source EPCPAGE (DS:RDX) is valid and accessible
// atomically read VALID, BLOCKED, PT, PENDING, MODIFIED,
R, and enclaveSECS
if ((EPCM(DS:RDX).VALID is 0) OR
```

-continued

```
    (EPCM(DS:RDX).R is 0) OR
    (EPCM(DS:RDX).BLOCKED is not 0) OR
    (EPCM(DS:RDX).PT is not PT_REG) OR
    (EPCM(DS:RDX).PENDING is not 0) OR
    (EPCM(DS:RDX).MODIFIED is not 0) OR
    (EPCM(DS:RDX).enclaveSECS != CR_ACTIVE_SECS) OR
    (EPCM(DS:RDX).enclaveADDRESS != DS:RDX))
{
    #PF(DS:RDX);
}
// verify that target EPCPAGE (DS:RCX) is valid and accessible
// atomically read VALID, BLOCKED, PT, PENDING, MODIFIED
and enclaveSECS
if ((EPCM(DS:RCX).VALID is 0) OR
    (EPCM(DS:RCX).BLOCKED is not 0) OR
    (EPCM(DS:RCX).PENDING is not 1) OR
    (EPCM(DS:RCX) MODIFIED is not 0) OR
    (NOT ((EPCM(DS:RCX).PT is PT_REG) OR
    (EPCM(DS:RCX).PT is PT_TCS)) OR
    (EPCM(DS:RCX).enclaveSECS != CR_ACTIVE_SECS))
{
    #PF(DS:RCX);
}
// try to acquire EDMM lock on target page
if (NOT EPCM(DS:RCX).EDMM(ACQUIRE))
{
    #GP(0);
}
// verify that the target page is in correct state
// atomically read and recheck EPCM fields
if ((EPCM(DS:RCX).VALID is 0) OR
    (EPCM(DS:RCX).PENDING is not 1) OR
    (EPCM(DS:RCX) MODIFIED is not 0) OR
    (EPCM(DS:RCX).R is not 1) OR
    (EPCM(DS:RCX).W is not 1) OR
    (EPCM(DS:RCX).X is not 0) OR
    (EPCM(DS:RCX).PT != SCRATCH_SECINFO.FLAGS.PT)
    (EPCM(DS:RCX).enclaveSECS != CR_ACTIVE_SECS) OR
    (EPCM(DS:RCX).enclaveADDRESS != DS:RCX))
{
    RFLAGS.ZF = 1;
    RAX = SGX_PAGE_ATTRIBUTES_MISMATCH;
    goto DONE;
}
<< copy source (DS:RDX) into target (DS:RCX) >>
// perform TCS-specific checks
if (SCRATCH_SECINFO.FLAGS.PT is PT_TCS)
{
    // Check the TCS reserved fields
    // Note that FLAGS field is not considered a reserved field,
    // even though it has some reserved bits
    if (DS:RCX.RESERVED != 0)
    {
        EPCM(DS:RCX).EDMM(RELEASE);
        #GP(0);
    }
    // Check consistency of FS & GS Limit
    if ((TMP_SECS.ATTRIBUTES.MODE64BIT = 0) AND
    ((DS:RCX.FSLIMIT & 0xFFF != 0xFFF) OR
    (DS:RCX.GSLIMIT & 0xFFF != 0xFFF)))
    {
        EPCM(DS:RCX).EDMM(RELEASE);
        #GP(0);
    }
    // check TCS.FLAGS.DBGOPTIN, TCS stack, and TCS status
    if (((DS:RCX).FLAGS.DBGOPTIN is not 0) OR
    ((DS:RCX).CSSA >= (DS:RCX).NSSA) OR
    ((DS:RCX).AEP is not 0) OR
    ((DS:RCX).STATE is not 0)
    {
        EPCM(DS:RCX).EDMM(RELEASE);
        #GP(0);
    }
    // force EPCM RWX bits to 0
    SCRATCH_SECINFO.FLAGS R = 0;
    SCRATCH_SECINFO.FLAGS W = 0;
    SCRATCH_SECINFO.FLAGS X = 0;
}
// update EPCM with new access rights and type
```

-continued

```
EPCM(DS:RCX).R = SCRATCH_SECINFO.FLAGS.R;
EPCM(DS:RCX).W = SCRATCH_SECINFO.FLAGS.W;
EPCM(DS:RCX).X = SCRATCH_SECINFO.FLAGS.X;
// clear PENDING bit to mark operation complete
// PENDING bit must be cleared last
EPCM(DS:RCX).PENDING = 0;
// clear EAX and ZF to indicate successful completion
RAX = 0;
RFLAGS.ZF = 0;
DONE:
// clear flags
RFLAGS.CF=0;
RFLAGS.PF=0;
RFLAGS.AF=0;
RFLAGS.OF=0;
RFLAGS.SF=0;
// releaenclave EDMM lock
EPCM(DS:RCX).EDMM(RELEASE);
end_of_flow
```

Flags Affected:

| | |
|---|---|
| ZF | Set when the instruction has completed with error, otherwise clear. |

| Protected Mode Exceptions: | |
|---|---|
| #GP(0) | If a memory operand effective address is outside the DS segment limit.<br>If DS segment is unusable<br>If a memory operand is not properly aligned.<br>If the instruction fails to acquire one of the requisite locks. |
| #PF(fault-code) | If a page fault occurs in accessing memory operands, including EPCM-induced faults. |
| 64-Bit Mode Exceptions: | |
| #GP(0) | If a memory address is in a non-canonical form.<br>If a memory operand is not properly aligned.<br>If the instruction fails to acquire one of the requisite locks. |
| #PF(fault-code) | If a page fault occurs in accessing memory operands, including EPCM-induced faults. |

In one embodiment, the EACCEPTCOPY instruction can include other operations or other code not included in the preceding exemplary pseudo code. In another embodiment, the EACCEPTCOPY instruction can include a portion of the exemplary pseudo code or the other operations. In another embodiment, the EACCEPTCOPY instruction can include code or operations not explicitly listed in the preceding exemplary pseudo code.

In one example, the EACCEPTCOPY instruction can include EACCEPTCOPY error codes. An example of the EACCEPTCOPY error codes is seen below:

| | Description |
|---|---|
| SGX_PAGE_ATTRIBUTES_MISMATCH | The attributes of the target EPC page do not match the expected values. |

In another example, the EACCEPTCOPY instruction can include other EACCEPTCOPY error codes not explicitly listed in the preceding table. In another example, the EAC-CEPTCOPY instruction may not include error codes.

Figure 6A:
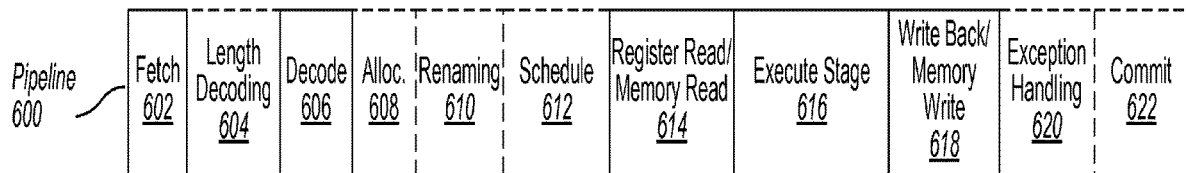
FIG. 6A is a block diagram illustrating an in-order pipeline and a register renaming stage, out-of-order issue/execution pipeline according to one embodiment.

FIG. 6A is a block diagram illustrating a micro-architecture for a processor 600 that implements secure memory repartitioning according to one embodiment. Specifically, processor 600 depicts an in-order architecture core and a register renaming logic, out-of-order issue/execution logic to be included in a processor according to at least one embodiment of the disclosure. The embodiments of the page additions and content copying can be implemented in processor 600.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 660. The decode unit 660 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 660 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 660 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6B:
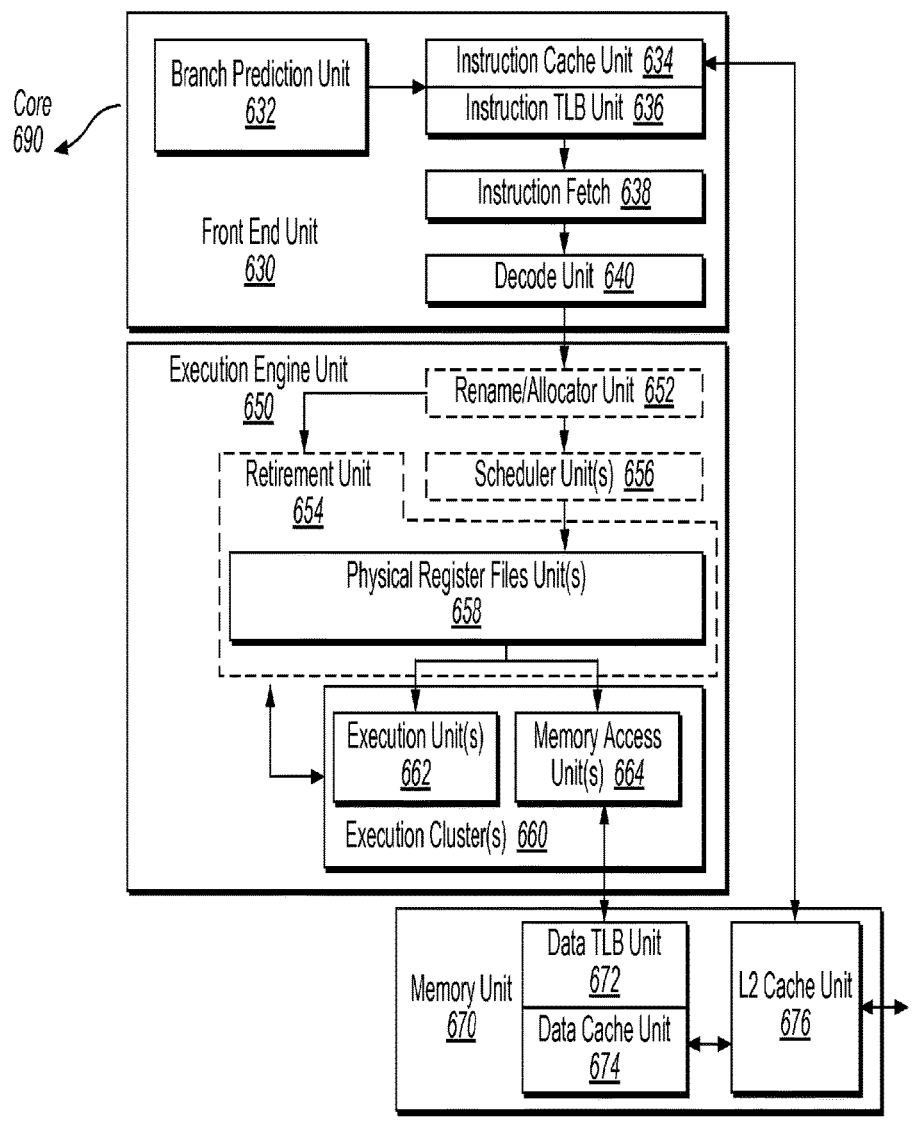
FIG. 6B is a block diagram illustrating a micro-architecture for a processor that implements secure memory repartitioning according to one embodiment.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
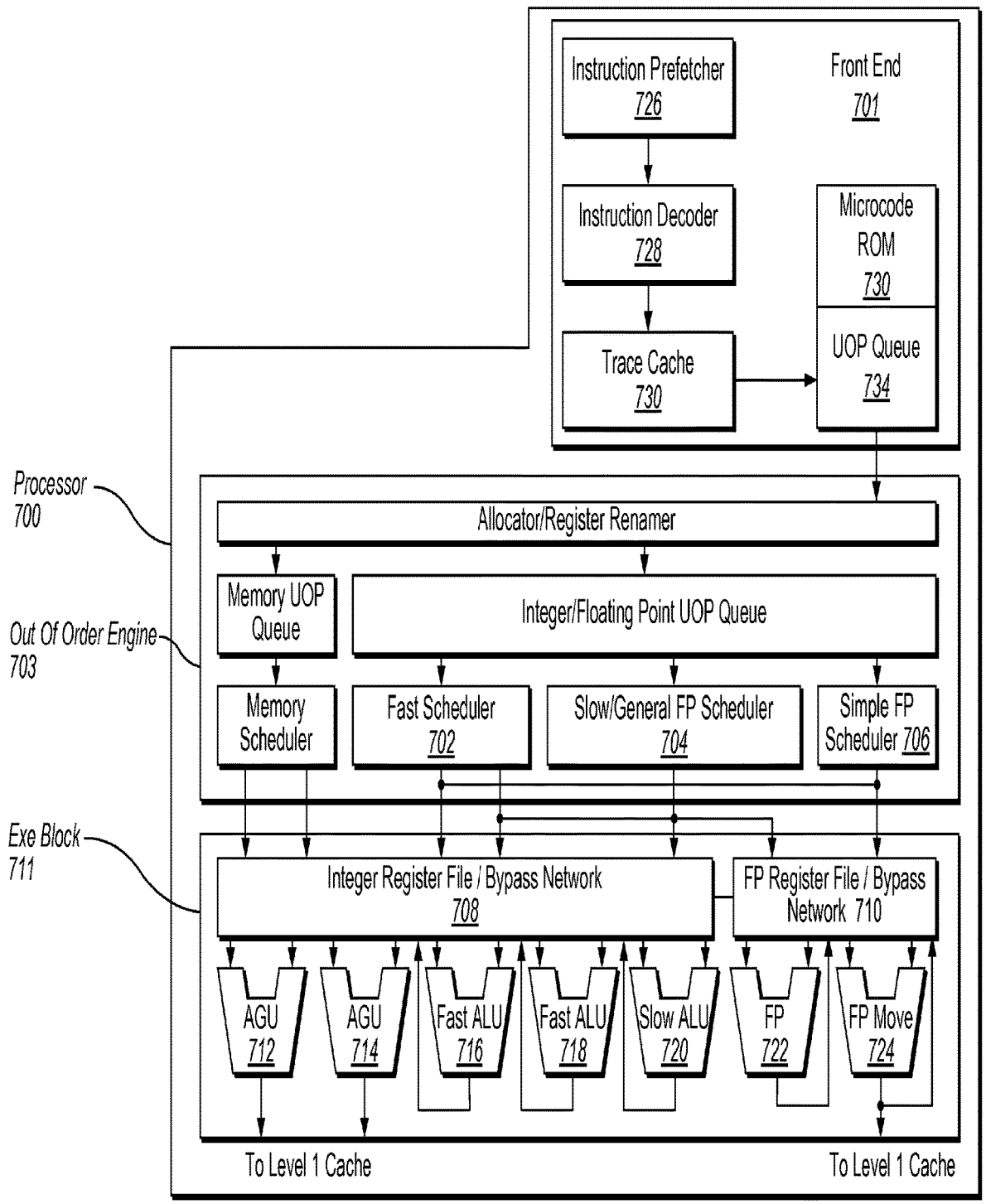
FIG. 7 illustrates a block diagram of the micro-architecture for a processor that includes logic circuits to perform secure memory repartitioning according to one embodiment.

FIG. 7 illustrates a block diagram of the micro-architecture for a processor 700 that includes logic circuits to perform secure memory repartitioning according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The embodiments of the page additions and content copying can be implemented in processor 700.

The front end 701 may include several units. In one embodiment, the instruction prefetcher 716 fetches instructions from memory and feeds them to an instruction decoder 718 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 710, 712, 714 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 710, 712, 714, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 710, floating point ALU 712, floating point move unit 714. For one embodiment, the floating point execution blocks 712, 714, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 710 as the slow ALU 710 includes integer execution hardware for long latency type of operations, such as a multiplier, shifts, flag logic, and branch processing. Memory load/store operations are executed by the AGUs 712, 714. For one embodiment, the integer ALUs 716, 718, 710, are described in the context of performing integer operations on 64 bit data operands. In alternative embodiments, the ALUs 716, 718, 710, can be implemented to support a variety of data bits including 16, 32, 128, 256, etc. Similarly, the floating point units 712, 714, can be implemented to support a range of operands having bits of various widths. For one embodiment, the floating point units 712, 714, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement secure memory repartitioning according to one embodiment. In one embodiment, the execution block 711 of processor 700 may include MCU 115, to perform secure memory repartitioning according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
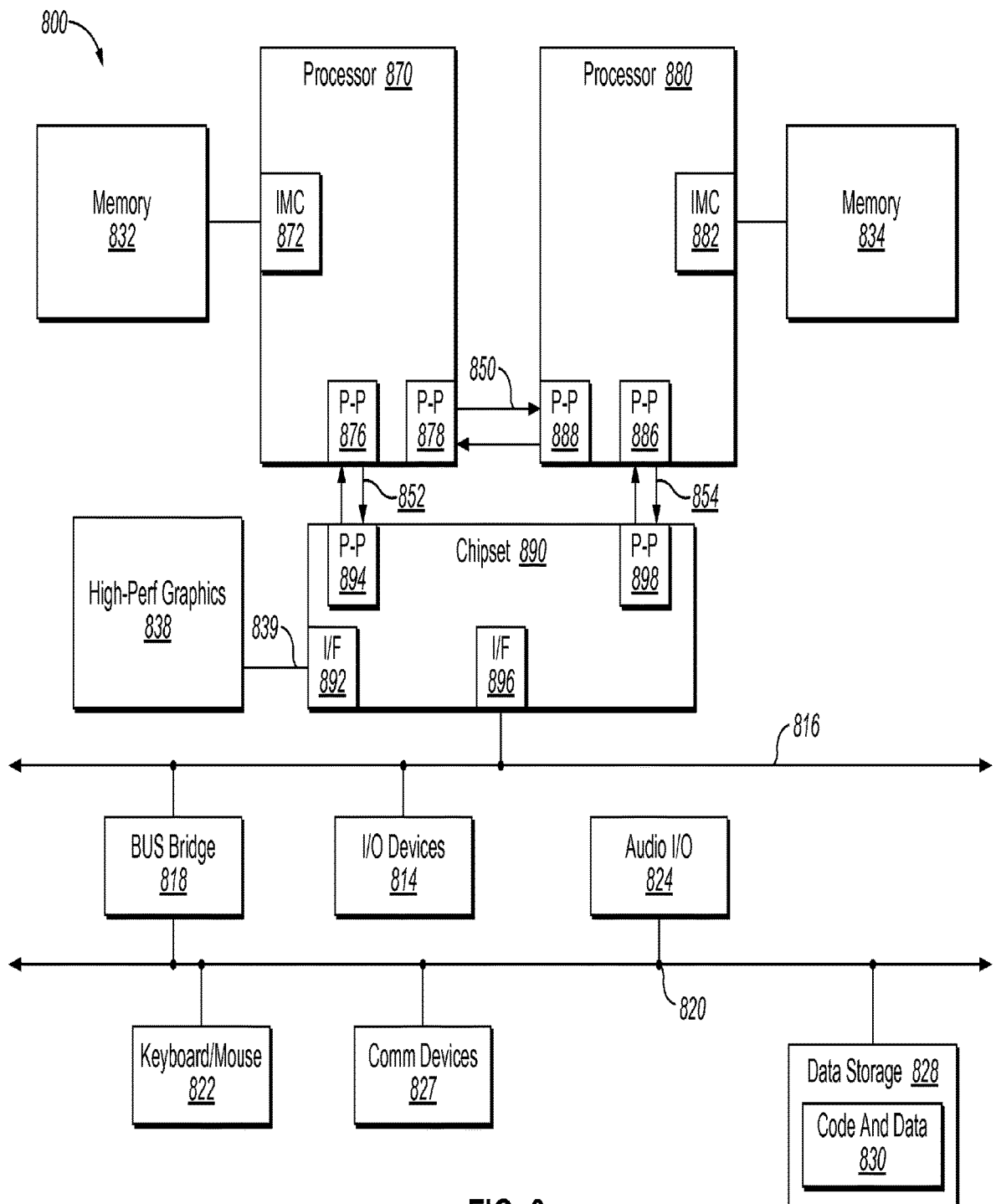
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. The processors each may include hybrid write mode logics in accordance with an embodiment of the present. The embodiments of the page additions and content copying can be implemented in the processor 870, processor 880, or both.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
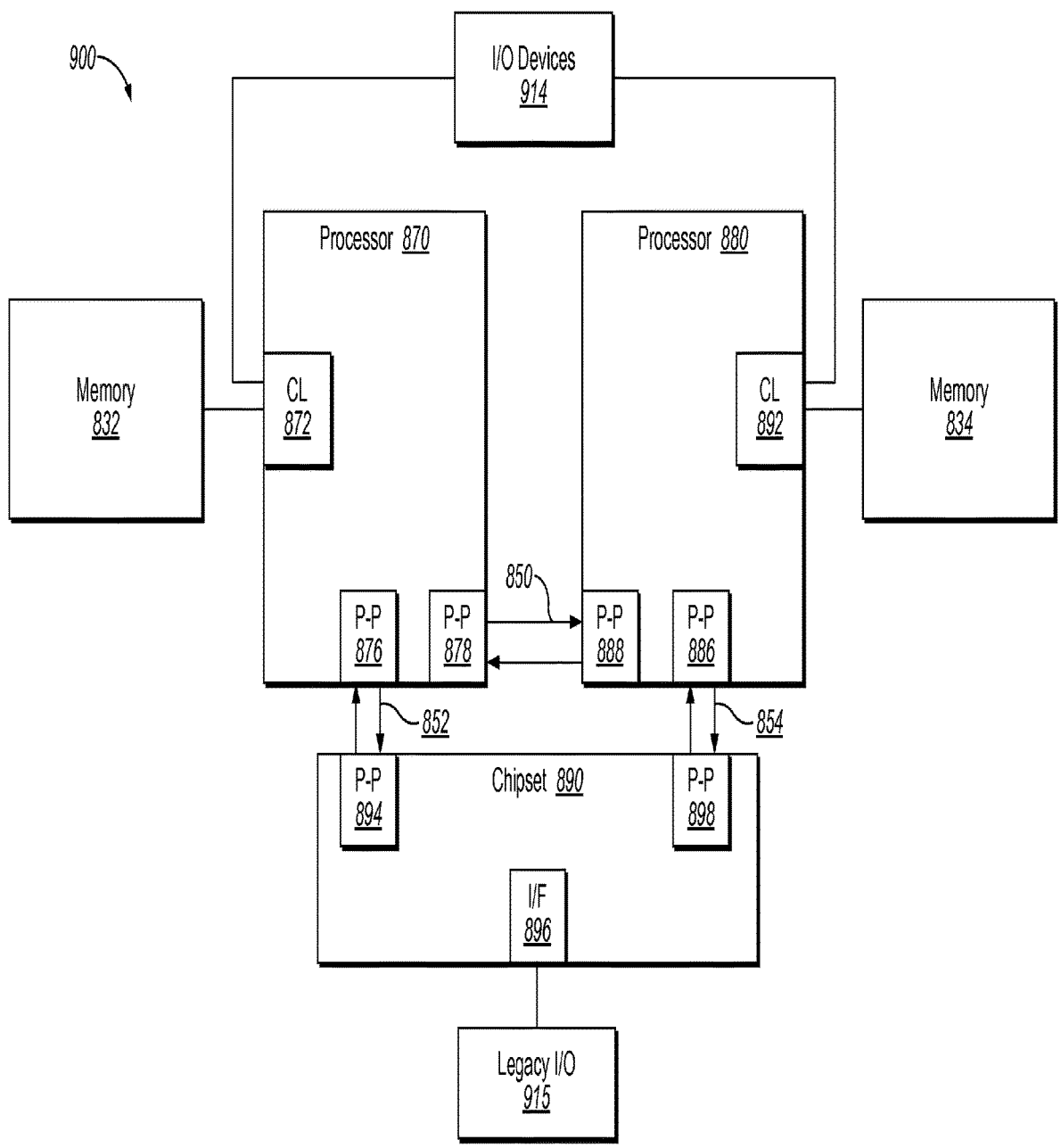
FIG. 9 is a block diagram of a computer system according to another implementation.

Referring now to FIG. 9, shown is a block diagram of a third system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 970, 980 may include integrated memory and I/O control logic ("CL") 972 and 982, respectively. For at least one embodiment, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 914 are also coupled to the control logic 972, 982. Legacy I/O devices 915 are coupled to the chipset 990. The embodiments of the page additions and content copying can be implemented in processor 970, processor 980, or both.

Figure 10:
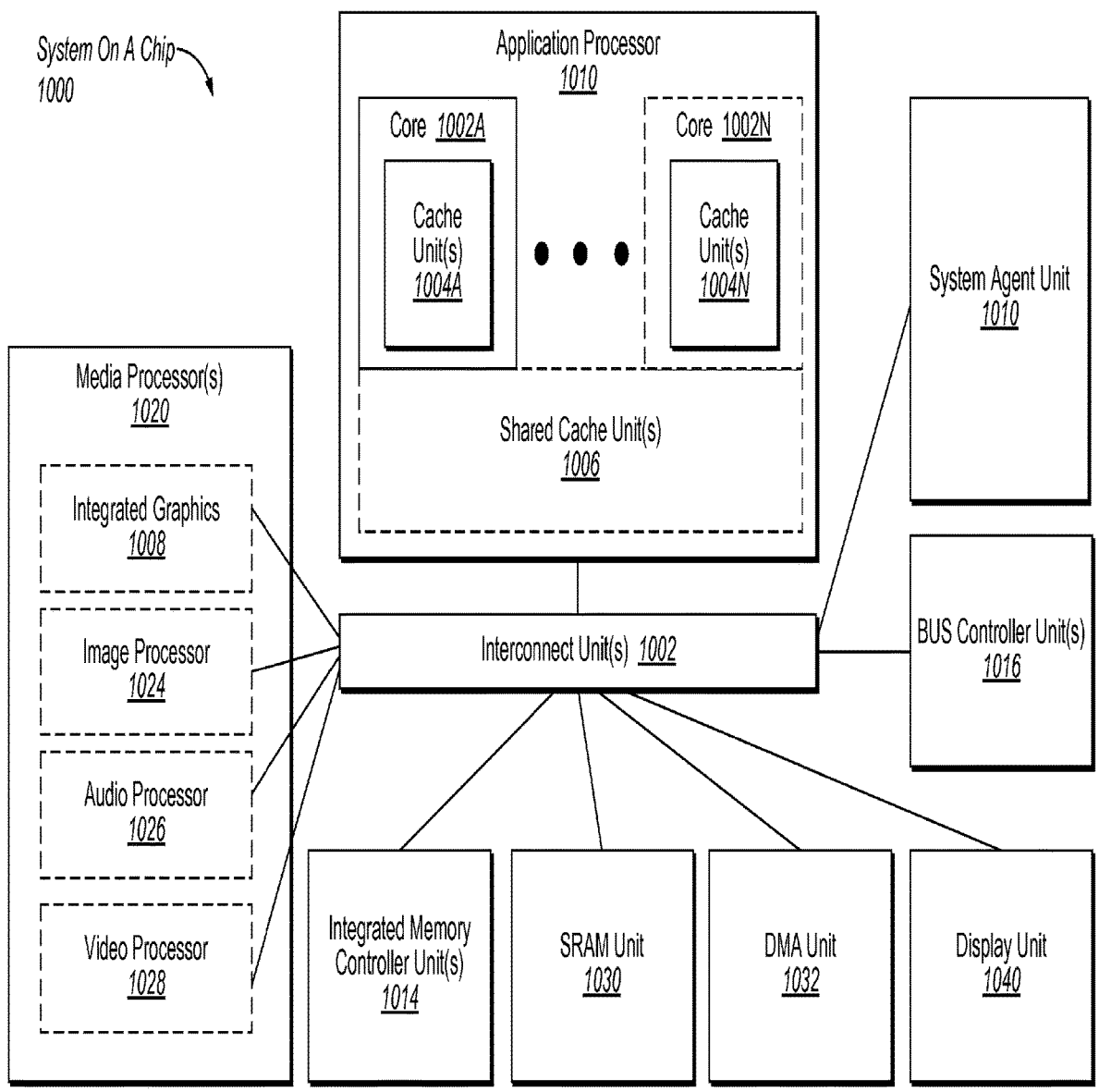
FIG. 10 is a block diagram of a system-on-a-chip according to one implementation.

FIG. 10 is an exemplary system on a chip (SoC) that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Also, dashed lined boxes are features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. The embodiments of the pages additions and content copying can be implemented in SoC 1000.

Figure 11:
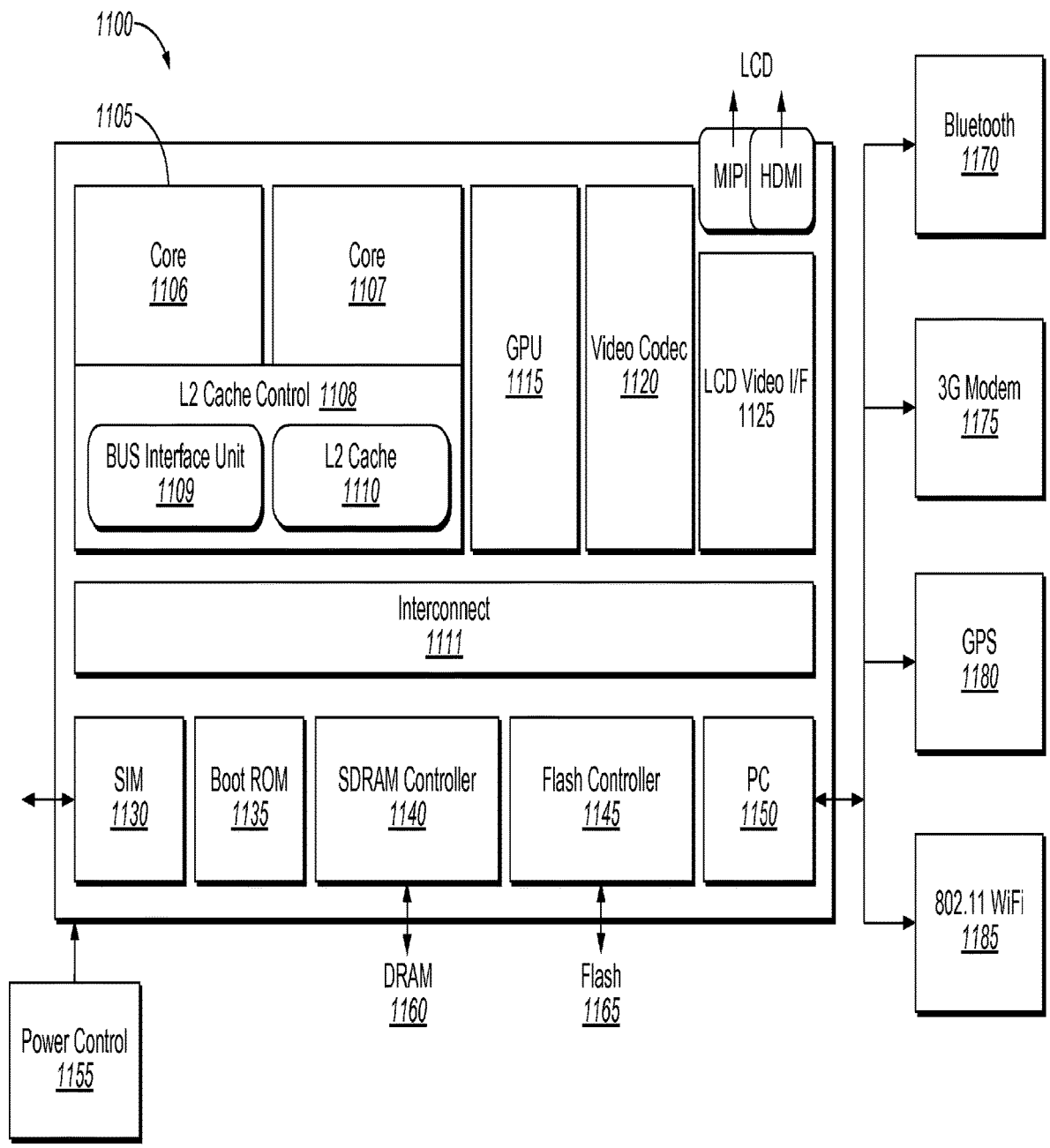
FIG. 11 illustrates another implementation of a block diagram for a computing system.

Turning next to FIG. 11, an embodiment of a system on-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
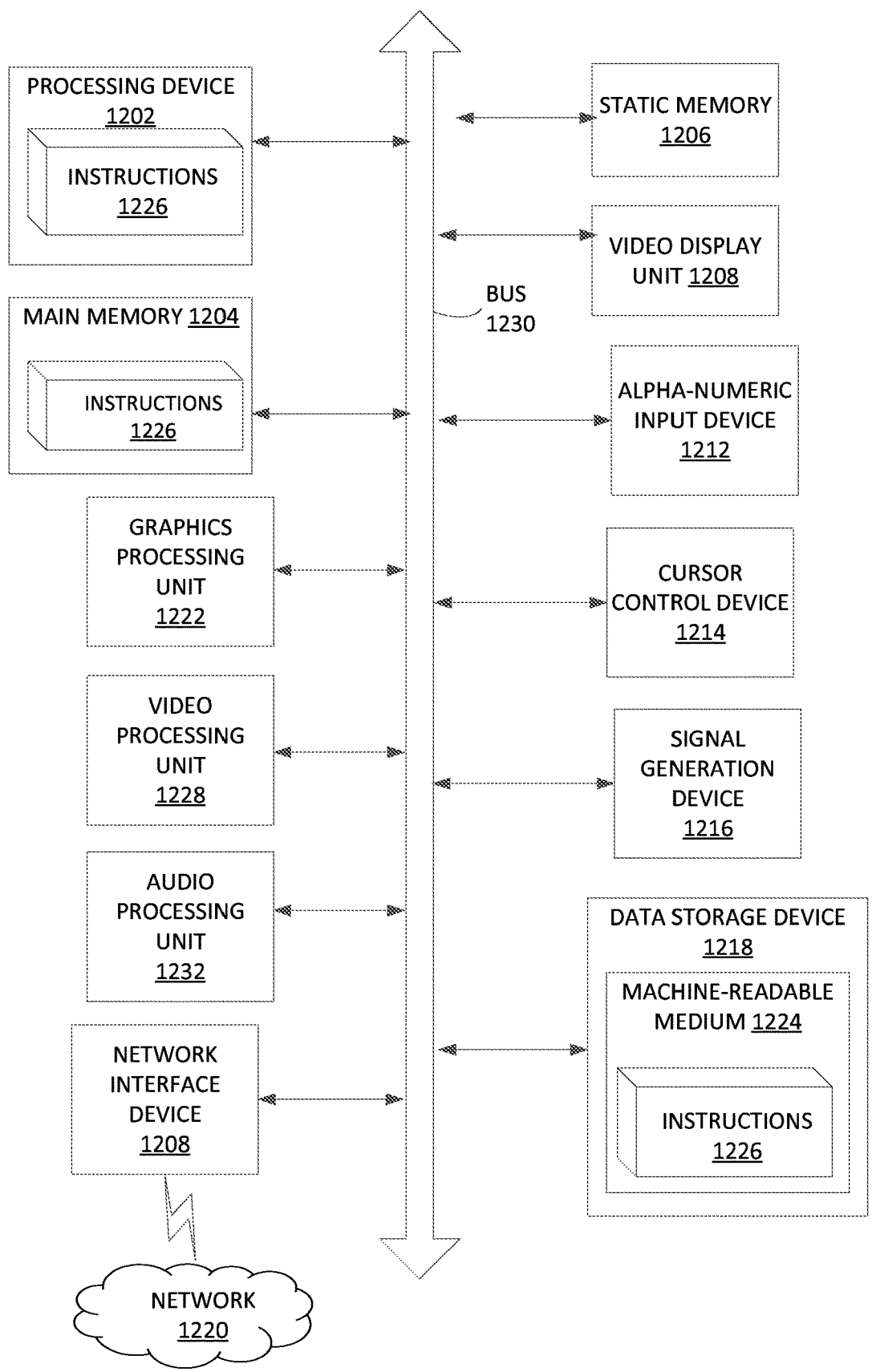
FIG. 12 illustrates another implementation of a block diagram for a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1200.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.) a static memory 1206 (e.g., flash memory, static random access memory (SRAM), etc.) and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processor cores. The processing device 1202 is configured to execute the processing logic 1226 for performing the operations discussed herein. In one embodiment, processing device 1202 can be part of the computing system 100 of FIG. 1. Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the processing device 1202, such as described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising: 1) a processor core; and 2) a memory controller coupled between the processor core and main memory, wherein the main memory comprises a protected region including secured pages, and wherein the processor core is to perform the following in response to a content copy instruction: a) initialize a target page in the protected region of an application address space; b) select content of a source page in the protected region to be copied; and c) copy the selected content to the target page in the protected region of the application address space.

In Example 2, the processor core of Example 1, in response to the content copy instruction, is to further copy the selected content to the target page while an application is running, wherein the application is stored in the protected region.

In Example 3, the processor core of any one of Examples 1-2 is to add the target page to the protected region in response to a page add instruction.

In Example 4, the processor core of any one of Examples 1-3 is to: determine a privilege level of the target page and perform the page add instruction when a privilege level of the target page is zero.

In Example 5, the processor core of any one of Examples 1-4 is to: determine when an page add instruction fails, wherein fails when: an operand is not properly aligned; unsupported security attributes are set; selected software guard extensions (SGX) enclave control structure (SECS) pages are locked by another thread; the EAUG instruction does not contain an effective address of an enclave page cache (EPC) page; the EPC page is locked by another thread; the EPC page is in a valid state; or a selected protected region offset is outside of an effective address range of the protected region; and determine when an content copy instruction fails, wherein the content copy instruction fails when: an operand is not properly aligned; an unsupported access right combination is requested; the operand does not refer to an enclave page cache (EPC) page; the target page or the source page is in use by another thread; the EPC page does not have a selected PT_REG type; or the EPC page is not a valid page.

In Example 6, the page add instruction of any one of Examples 1-5 includes memory parameter information, wherein the memory parameter information comprises: an effective address of a page information (PAGEINFO) structure; and an effective address of an enclave page cache (EPC) page.

In Example 7, the PAGEINFO structure of any one of Examples 1-6 comprises: a security information (SECINFO) structure of the target page; and a page information structure of the source page (SRCPAGE).

In Example 8, the processor core of any one of Examples 1-7, in response to the page add instruction, is to: associate a free enclave page cache (EPC) page with one or more selected software guard extensions (SGX) enclave control structure (SECS) pages in the section of the protected region; store a protected region offset attribute and a protected region security attribute in an enclave page cache map (EPCM); and zero contents of the target page.

In Example 9, the processor core of any one of Examples 1-8 is to: determine when a page acceptance instruction is received, wherein a status of the target page remains pending until the page acceptance instruction is received and add the target page to the protected region of the application address space when the page acceptance instruction is received.

In Example 10, the content copy instruction of any one of Examples 1-9 includes memory parameter information, wherein the memory parameter information comprises: a software guard extensions (SGX) enclave control (SEC) information (SECINFO) structure, wherein the SECINFO structure specifies a selected permissions level for the target page being modified and a requested type for the target page when the selected content is copied; an effective address of the target page that the content is copied to; and an effective address of the source page that the content is copied from.

In Example 11, the source page of any one of Examples 1-10: is a valid enclave page cache (EPC) page and is a PT_REG type that is not in a blocked state, a pending state, or a modified state.

In Example 12, the target page of any one of Examples 1-11: is a valid enclave page cache (EPC) page and is a PT_REG type that is in a pending state but not a modified state or a blocked state.

Various embodiments may have different combinations of the structural features described above. For instance, all optional features of the computing system described above may also be implemented with respect to the method or process described herein and specifics in the examples may be used anywhere in one or more embodiments.

In Example 13, a method comprising: 1) decoding, by a processor core of a processor, a content copy instruction to copy selected content of a source page in a protected region of a main memory coupled to the processor core; and 2) executing, by the processor core, the content copy instruction to copy the selected content of the source page to a target page within the protected region.

In Example 14, the method of Example 13 further comprises in response to the content copy instruction: a) allocating, by the processor core, the target page of the protected region; b) selecting, by the processor core, content of the source page of the protected region to be copied; and c) copying, by the processor core, the selected content to the target page in the protected region.

In Example 15, the method of Examples 13-14 further comprises in response to the content copy instruction: a) updating, by the processor core, permissions of the target page; b) clearing, by the processor core, a pending bit of the target page to indicate use of the target page is completed; and c) releasing, by the processor core, an enclave dynamic memory management (EDMM) lock on the target page.

In Example 16, the method of Examples 13-15 further comprises modifying, by the processor core, permissions of the target page.

In Example 17, the method of Examples 13-16 further comprises: a) validating, by the processor core, selected source parameters of the source page; orb) validating, by the processor core, selected target parameters of the target page.

In Example 18, the method of Examples 13-17 wherein validating, by the processor core, the selected source parameters of the source page further comprises: a) determining a readable status of the source page; and b) determining an enclave linear address range (ELRange) of the source page.

In Example 19, the method of Examples 13-18 wherein validating, by the processor core, the selected target parameters of the target page further comprises: a) determining a writable status of the target page; b) determining an enclave linear address range (ELRange) of the target page; and c) determining a location of the target page within the protected region.

In Example 20, the method of Examples 13-19 wherein validating, by the processor core, the selected target parameters of the target page further comprises: a) acquiring, by the processor core, an enclave dynamic memory management (EDMM) lock; b) verifying, by the processor core, that a status of the target page is regular and pending; and c) verifying, by the processor core, that the target page is accessed through a correct linear address.

Various embodiments may have different combinations of the structural features described above. For instance, all optional features of the processors and methods described above may also be implemented with respect to a system described herein and specifics in the examples may be used anywhere in one or more embodiments.

In Example 21, a system comprising: 1) a processor comprising a plurality of functional units to execute instructions; and 2) a memory device coupled to the processor, wherein the memory device is operable to store code memory and data memory and comprises a protected region including secured pages, wherein the processor is to: a) decode an instruction to copy content within the protected region; and b) execute the content copy instruction to copy content from a first secured page to a second secured page.

In Example 22, in the system of Example 21 the processor is to copy content from a source secured page to a target secured page in response to the content copy instruction, and wherein the processor is to perform the following in response to the instruction: a) initialize the second secured page in a protected region of an application address space; b) select content of an first secured page in the protected region to be copied; and c) copy the selected content to the second secured page in the protected region of the application address space.

In Example 23, in the system of Examples 21-22 the processor, in response to the instruction, is to copy the selected content to the second page while an application is running, wherein the application is stored in the protected region.

In Example 24, in the system of Examples 21-23 the memory allocation process comprises another instruction to add the first secured page to the protected region.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to secure memory repartitioning in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. An apparatus comprising:
    an instruction decoder to decode a first instruction to initialize a first page in an enclave page cache; and execution logic, coupled to the instruction decoder, to perform one or more operations corresponding to the first instruction, including:

copying content of a second page into the first page, wherein the second page is existing within the same enclave page cache as the first page;

modifying access rights associated with the first page; and changing a state of the first page from pending.

2. The apparatus of claim 1, wherein the first page is to be dynamically allocated.

3. The apparatus of claim 1, wherein the first page is to be created by a second instruction.

4. The apparatus of claim 1, wherein the first instruction is executable only within a protected memory region including the enclave page cache.

5. The apparatus of claim 1, wherein a register is to contain an effective address of a security information structure of the first page.

6. The apparatus of claim 1, wherein a register is to contain an effective address of the first page.

7. The apparatus of claim 1, wherein a register is to contain an effective address of the second page.

* * * * *